United States Patent
Amason et al.

(10) Patent No.: US 9,686,664 B1
(45) Date of Patent: Jun. 20, 2017

(54) INCIDENT MONITORING AND RESPONSE SYSTEM

(71) Applicant: Alpha-Shield LLC, Oneonta, AL (US)

(72) Inventors: Daniel Lee Amason, Altoona, AL (US); Taylor Ward Jennings, Oneonta, AL (US)

(73) Assignee: Alpha-Shield, LLC, Oneonta, AL (US)

( * ) Notice: Subject to any disclaimer, the term of this patent is extended or adjusted under 35 U.S.C. 154(b) by 0 days.

(21) Appl. No.: 15/099,688

(22) Filed: Apr. 15, 2016

(51) Int. Cl.
H04M 11/04 (2006.01)
H04W 4/22 (2009.01)
H04M 1/725 (2006.01)
H04W 24/08 (2009.01)
G06F 3/0482 (2013.01)

(52) U.S. Cl.
CPC ............ H04W 4/22 (2013.01); G06F 3/0482 (2013.01); H04M 1/72577 (2013.01); H04W 24/08 (2013.01)

(58) Field of Classification Search
CPC ..... H04W 4/22; H04W 24/08; H04W 76/007; G06F 3/0482; H04M 1/72577; H04M 11/04; G08B 27/006; G08B 13/00
See application file for complete search history.

(56) References Cited

U.S. PATENT DOCUMENTS

| 7,460,020 | B2 | 12/2008 | Reyes et al. | |
| 2007/0207771 | A1 | 9/2007 | Bowser et al. | |
| 2012/0063270 | A1* | 3/2012 | Angell | G01S 5/0027 367/127 |
| 2013/0237175 | A1* | 9/2013 | Piett | H04W 4/12 455/404.1 |
| 2014/0211667 | A1 | 7/2014 | Hochndoner et al. | |
| 2014/0306802 | A1 | 10/2014 | Hibbs | |
| 2015/0138444 | A1* | 5/2015 | Hirabayashi | H04N 5/4403 348/734 |
| 2015/0199896 | A1 | 7/2015 | Estes et al. | |
| 2015/0204109 | A1 | 7/2015 | Ergenbright et al. | |
| 2015/0243150 | A1* | 8/2015 | Kang | G06Q 10/00 340/601 |

FOREIGN PATENT DOCUMENTS

WO    WO-2014/116969 A1    7/2014

* cited by examiner

Primary Examiner — Barry Taylor
(74) Attorney, Agent, or Firm — Maynard, Cooper & Gale, LLP; Joshua V. Van Hoven, Esq.

(57) ABSTRACT

An incident monitoring and response system may include observer communication devices that are located in an area where an incident is occurring within a monitored region. A monitoring station sends an incident mode message to observer communication devices within the area. Upon receiving the incident mode message, the observer communication devices enter an incident mode in which the functionality of the device is limited. This limited functionality includes limiting the types of communications that an observer may engage in and the types of applications that can be accessed.

24 Claims, 13 Drawing Sheets

INCIDENT MONITORING AND RESPONSE SYSTEM

BACKGROUND

Public areas such as schools, airports, malls, and theaters have recently been the target of large-scale criminal incidents. Such incidents include physical attacks such as mass shootings and terrorist incidents, but also include attacks on property and social order such as riots, flash mobs and violent protests. Incidents are often coordinated through communication mediums such as cell phones, text messages, social media, and chat rooms. Using such technologies, a group of active shooters or a flash mob may coordinate their activities in a manner to inflict maximum damage or disruption while avoiding law enforcement personnel.

Individuals in the area of the incident may observe the incident or circumstances related to an incident. For example, observers may see assailants, hear gunshots, see or hear victims, and observe the progress of responders such as police and medical personnel. A typical observer will have a communication device such as a smart phone, smart watch, or tablet device with them while observing the incident. These communication devices provide various communication tools such as cellular phone connectivity, text messages, messaging boards, and social media outlets. They also may include sensors, cameras, microphones, and other tools that may be useful in acquiring information about an incident.

The proliferation of communication devices allows observers to provide information to incident reporting systems, law enforcement, acquaintances, or in some cases, anyone who is able to view a social media feed. Observers often provide contradictory or irrelevant information regarding an incident, which makes it difficult for law enforcement to discern the relevant facts to respond to the incident. In addition, the large volume and diversity of available information increases the difficulty of distinguishing relevant information from false or irrelevant information. Many observers may begin to use a large amount of bandwidth at the same time, increasing the load on the communication network in the area of the incident and possibly causing relevant communications (e.g., from responders or direct observers) to be blocked. Communications to third parties such as acquaintances or strangers may cause more people to flock to the area of the incident in an effort to assist or out of curiosity. This response increases the number of bystanders in the area of the incident and may also cause traffic problems that prevent law enforcement or other responders from reaching the incident.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
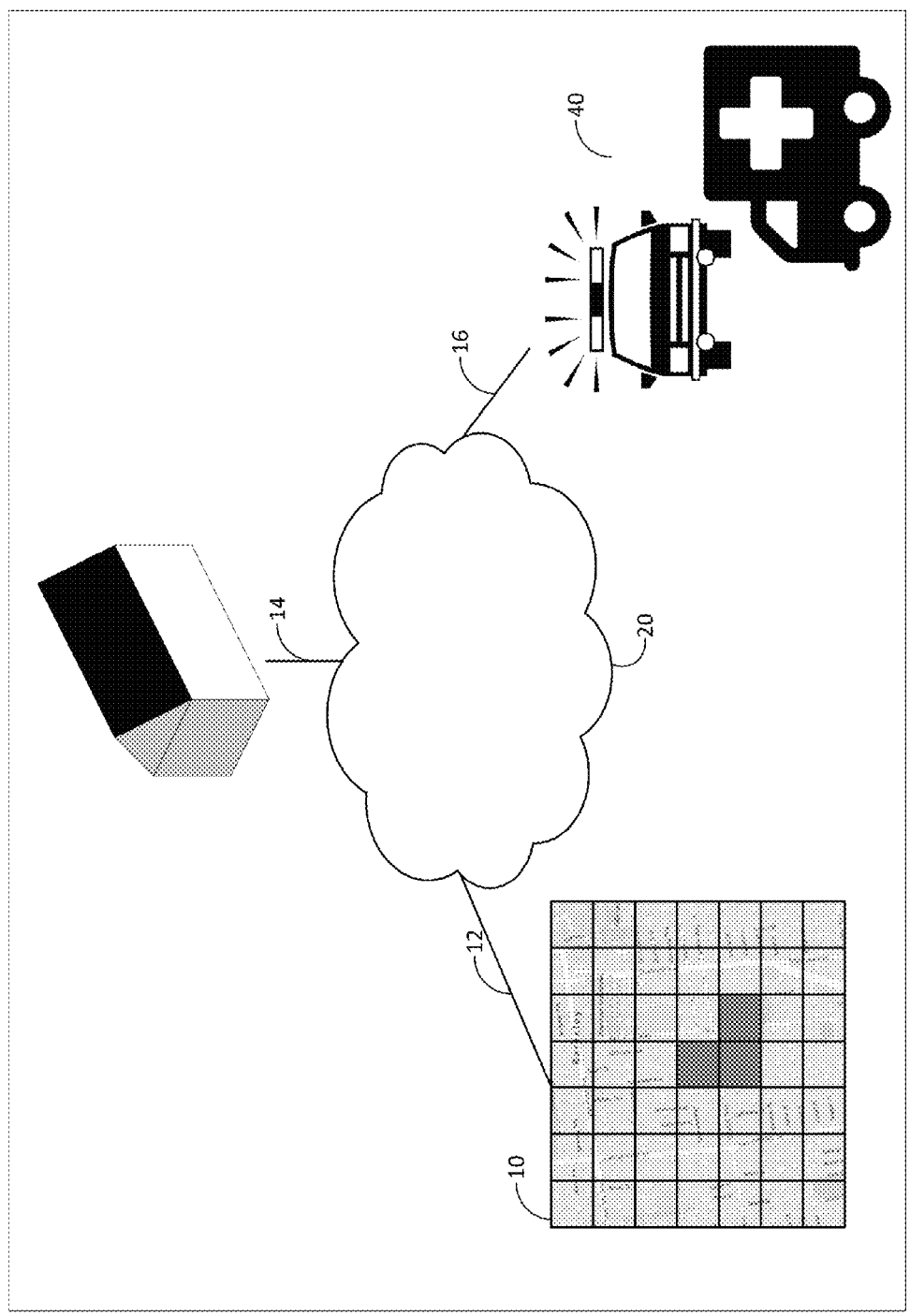
FIG. 1 shows an illustrative incident monitoring and response system in accordance with some embodiments of the present disclosure.

A method of controlling an observer communication device during an incident comprises receiving, via a first communication interface of a plurality of communication interfaces of the observer communication device, one or more incident messages, wherein the one or more incident messages provide incident information and require the observer communication device to enter an incident mode, controlling access of one or more applications of the observer communication device to the plurality of communication interfaces based on the incident mode, generating an incident mode user interface for the observer communication device based on the incident information, displaying the incident mode user interface at a display of the observer communication device, controlling access of the one or more applications of the observer communication device to the display based on the incident mode, receiving a user input associated with the incident mode at the user interface, transmitting a response message to a monitoring system via one or more of the plurality of communication interfaces, wherein the response message is based on the user input.

A communication device for operating in a normal mode and an incident mode, the communication device comprises a plurality of communication interfaces, a user interface, a processing element, and one or memory devices. During a normal mode the plurality of communication interfaces are accessible by a plurality of applications. During an incident mode one or more of the plurality of applications are unable to access the plurality of communications interfaces. During the normal mode the plurality of applications are able to provide information for display at the user interface and to receive user inputs at the user interface. During the incident mode the plurality of applications are not able to provide information for display at the user interface and to receive user inputs at the user interface. The processing element configured to execute instructions, control the operation of the plurality of communication devices, and control the operation of the user interface. The one or more memory devices store incident mode instructions. The incident mode instructions cause the processing element to receive one or more incident messages vie one or more of the plurality of communication interfaces. The one or more incident messages provide incident information and require the observer communication device to enter an incident mode. The incident mode instructions further cause the processing element to initiate the incident mode at the plurality of communications interfaces and the user interface, display an incident mode user interface at a display of the user interface, receive a user input associated with the incident mode from the user interface, and transmit a response message to a monitoring system via one or more of the plurality of communication interfaces. The response message is based on the user input.

A non-transitory computer-readable storage medium comprises instructions stored therein, which when executed by one or more processors, cause the one or more processors to perform operations. Those operations comprise receiving one or more incident messages from a first communication interface of a plurality of communication interfaces of an observer communication device, wherein the one or more incident messages provide incident information and require the observer communication device to enter an incident mode, controlling access of one or more applications of the observer communication device to the plurality of communication interfaces based on the incident mode, generating an incident mode user interface for the observer communication device based on the incident information; providing information for the incident mode user interface to a display of the observer communication device, controlling access of the one or more applications of the observer communication device to the display based on the incident mode, receiving a user input associated with the incident mode from the user interface, and providing a response message to be transmitted to a monitoring system via one or more of the plurality of communication interfaces, wherein the response message is based on the user input.

FIG. 1 depicts an exemplary incident monitoring and response system 1 in accordance with some embodiments of the present disclosure. In one embodiment, the incident monitoring and response system 1 may include a monitored region 10, a monitoring station 30, and responders 40. Communication devices within the monitored region 10 and communications devices of responders 40 may communicate with monitoring station 30 through a network 20 and communications links 12, 14, and 16.

A monitored region 10 may include any suitable region such as a jurisdictional area (e.g., a city, municipality, state, county, country, transportation district, etc.), a geographic region (e.g., a watershed, mountain range, valley, bay, river, etc.), a particular location (e.g., a school, mall, sports venue, government building, factory, etc.), a user-defined region (e.g., a region defined by longitude and latitude, coordinates, regions defined by shapes or drawing tools, etc.), any other suitable mechanism for defining a monitored region 10, or any combination thereof. In an exemplary embodiment, a grid system such as a Universal Transverse Mercator (UTM) system, Ordnance Survey system, Military Grid Reference System (MGRS), or any other suitable grid system may overlie the monitored region 10. The grid system may be used to define locations of sub-regions within the monitored region 10 as described herein.

In an embodiment, notifications may be provided to the monitoring station 30, which may indicate that an incident may have occurred at a location within monitored region 10.

The notifications may be provided in a variety of manners, such as by an individual contacting 911, a police or security service identifying an incident, monitoring of social media activity, gunshot sensors, human or video monitoring of surveillance devices, any other suitable notification technique, or any suitable combination thereof. The notifications may provide information about the incident such as the type of incident, description of assailants, number of assailants, time of the incident, description of injured persons or property, any other suitable information, or any combination thereof. As will be discussed herein, a monitoring station 30 may identify a sub-region of the monitored region 10 that is impacted by the incident based on the notifications. The sub-region may be identified in any suitable manner (e.g., jurisdictional regions, geographic regions, locations, ad-hoc regions, etc.), but in an exemplary embodiment is identified based on portions of the grid system that correspond to the where the incident is likely to be occurring within the monitored region 10. This is depicted in monitored region 10 of FIG. 1 as the shaded portions of the grid.

The notifications from observers within a monitored region 10 may be provided to monitoring station 30 over communication links 12 and 14 and network 20. Moreover, in some embodiments, communications between monitored region 10 and responders 40 may occur through communication links 14 and 16 and network 20. The communication links 12, 14, and 16, and the network 20, may implement any suitable communication system or combination thereof, such as cellular, Internet, satellite, radio, optical, and other suitable communication networks and methods.

Communications devices of observers within the sub-region of monitored region 10 may enter an incident mode in response to communications from monitoring station 30. Any device that is connected to a communication system (e.g., a cell phone, tablet, computer, radio, etc.) may receive the notification to enter the incident mode, in which the functionality of the communication device may be modified, for example, to limit available functionality, to provide incident reporting options, and to implement monitoring. In this manner, the communication devices may provide information that is useful for incident response and monitoring while limiting detrimental communications. For example, excessive phone calls, texts, and e-mails from a sub-region where an incident is occurring may limit the ability of a monitoring station 30 or responders 40 to address the most important communications or may attract unhelpful onlookers, media, etc. Functionality such as social media may be monitored by assailants or bystanders, complicating efforts to address an incident. Other communications may be useful and may be enabled in response to an incident, such as reporting information about an assailant, number of assailants, presence of gunshots, location of assailants, presence of injured persons, severity of injuries, and other information that is directly relevant to responding to an incident. Components of the communication device may also be useful to provide monitoring for an incident. For example, a camera or microphone of a mobile device may be used to receive video of an incident or analyze audio (e.g., gunshot detection).

Monitoring station 30 may perform the communication, analysis, control, and other functionality as described herein. The monitoring station 30 can include a plurality of servers, computers, electronic devices, and human operators, and may be located at a central location or distributed over a number of facilities. In an exemplary embodiment, monitoring station 30 may process notifications received from responders 40 and observers within a monitored region 10, identify an impacted sub-region within the monitored region 10 based on those notification, initiate an incident mode for observer communication devices within the sub-region, analyze data received from communication devices operating in incident mode within the sub-region, and communicate with responders 40 regarding the incident.

As described herein, monitoring station 30 may receive notifications from a variety of sources such as phone calls, text messages, e-mails, social media, gunshot sensors, police reporting, and surveillance equipment. The notifications may be analyzed automatically (e.g., by servers and computing devices), by human users working at the monitoring station 30, or by a combination thereof. For example, in an embodiment, certain notifications such as social media feeds, text messages, sensor data and phone calls may be analyzed by an automated system initially, with summary information provided to a human operator. Notifications that are considered most relevant (e.g., notifications from police or other trusted individuals) may be prioritized for the human operator. Through the combination of electronic analysis and human analysis, a large volume of notifications within a monitored region 10 may be processed.

Monitoring station 30 may also identify sub-regions of the monitored region 10 based on received notifications. Once the sub-region has been identified, information about observer communication devices within the monitored region 10 may be used to determine which observer communication devices are within the sub-region. In an embodiment, information such as location data may be acquired based on cell towers, IP addresses, Wi-Fi addresses, GPS data, any other suitable location information, or any combination thereof. In some embodiments, communication devices running an incident monitoring application may be polled by the monitoring station 30 to provide location information (e.g., GPS data). Once the observer communication devices within the sub-region have been identified by monitoring station 30, monitoring station 30 may provide the incident mode message to the communication devices (e.g., through network 20 and communication links 12 and 14). As described herein, the observer communication devices within the sub-region may then enter the incident mode, invoking a limited functionality with specialized user interfaces and monitoring interfaces.

Monitoring station 30 may receive monitored data from observer communication devices within a sub-region of monitored region 10 and from responders 40. Based on this received data, monitoring station 30 may determine information such as number of assailants, assailant descriptions, type of incident, quantity of injuries, location of assailants, severity of injuries, presence of responders, demographic information about individuals within the sub-region, any other suitable information, or any combination thereof. Monitoring station 30 may also receive surveillance signals such as signals from communication devices operating in incident mode (e.g., camera and microphone signals), other surveillance equipment within the sub-region, and surveillance provided by responders 40. Based on this information, the monitoring station 30 may control the information that is available within the incident mode, as well as provide information to responders to allow them to better respond to the incident.

Monitoring station 30 may provide information for responders 40. Responders 40 may have radios, displays, augmented reality devices, and other equipment that provides them with access to information that may be used to respond to incidents. Based on the information that is provided from the notifications, from communication devices in the incident mode, and from responders 40 themselves, the monitoring station 30 may tailor information to assist the responders in responding to the incident, and in some embodiments, the information may also be tailored based on the type of responder (e.g., medical personnel, police personal, SWAT teams, military personal, etc.). Information may include expected locations of assailants, identifying information for assailants, expected locations of observers within the sub-region, injuries, severity of injuries, locations of other responders (e.g., by responder type), any other suitable information to assist in responding to the incident, or any combination thereof.

Responders 40 may have a variety of equipment and electronic devices that assist them in responding to incidents, such as radios, displays, smart watches, smart phones, tablets, computers, augmented reality devices, and other suitable general or customized devices. These devices may allow the responders 40 to display information about an incident, and to also provide monitoring data to the monitoring station 30 (e.g., through network 20 and communication links 14 and 16), for example, through customized interfaces of an application, as monitoring data from body cameras or other electronic devices, through speech information, or in any other suitable manner. In this manner, responders 40 may both receive information for responding to an incident and provide information to assist in monitoring of the incident.

Figure 2:
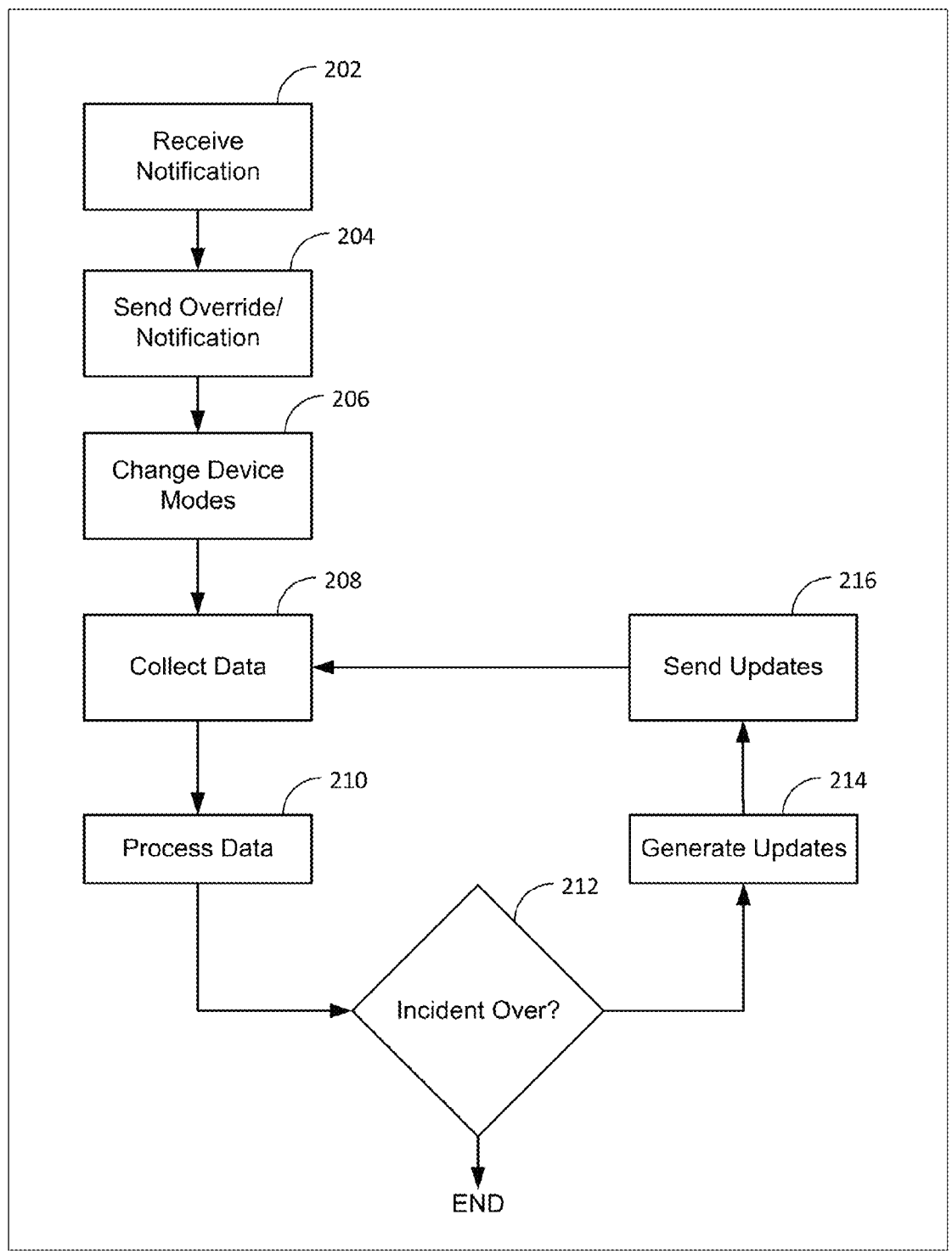
FIG. 2 depicts a flow diagram depicting illustrative steps for operating an incident monitoring and response system in accordance with some embodiments of the present disclosure.

FIG. 2 depicts exemplary steps for operating an incident monitoring and response system 1 in accordance with some embodiments of the present disclosure. The steps of FIG. 2 are provided in an exemplary sequence and flow, and it will be understood that some steps may be inserted or removed, and that a different flow and steps may be implemented.

In step 202, monitoring station 30 may receive notifications from within a monitored region 10 (e.g., from observers, surveillance devices, and analysis of electronic communications) and from responders 40. Based on these notifications, a monitoring station 30 may determine information about an event, such as a sub-region of the monitored region 10 in which the incident is occurring. Other information, such as information about the type of incident, may also be determined based on the notifications. Processing may then continue to step 204.

At step 204, the monitoring station 30 may determine, based on the received notifications, where the sub-region related to the incident is located within the monitored region 10. Although the sub-region may be identified in any suitable manner, in embodiments an expected incident location may be identified and the sub-region may include a buffer area around the incident location. In an embodiment, the size of the buffer area may be based on a confidence level for the incident location (e.g., with a larger buffer area corresponding to a lower confidence level). Once the sub-region is identified, monitoring station 30 may determine which observer communication devices are located within the sub-region. Once the observer communication devices are identified, incident mode notifications may be provided to the observer communication devices. In some embodiments, the incident mode notification may be tailored based on information about the incident, the type of communication device, expected proximity to the incident, information about the observer, or in any other suitable manner. The incident mode notification then may be transmitted to the observer communication devices within the sub-region of the monitored region 10. Processing may then continue to step 206.

At step 206, each observer communication device receiving the incident mode notification may enter the incident mode. In some embodiments, the incident mode notification may include parameters that may restrict the types of activities that are available in the incident mode, the types of user inputs that are allowed in the incident mode, and the type of monitoring that is provided by the communication devices in the incident mode. Based on this information, each communication device may enter its incident mode, disabling certain functionality (e.g., certain applications and communication functionality), providing specific inputs for use in providing information about the incident, and monitoring to provide surveillance information of the incident. Processing may then continue to step 208.

At step 208, each observer communication device within the sub-region of the monitored region 10 may collect data about the incident. As described herein, an observer may be provided with a limited menu of inputs that allow the user to provide specific information that is most relevant to an incident. Also as described herein, a communication device may provide monitoring such as through a camera or microphone of the communication device. This collected data may then be provided from the communication devices within a sub-region of the monitored region 10 to the monitoring station 30. Processing may then continue to step 210.

At step 210, monitoring station 30 may provide notifications to responders 40. As described herein, the notifications may provide information related to the incident and may be tailored based on the type of responder 40. Responders 40 may also collect information that is provided to the monitoring station 30, as described herein. Processing may then continue to step 212.

At step 212, processing station 30 may process the information and data received from the communication devices within the sub-region of the monitored region 10 and from responders 40. This information may be compiled and analyzed for use in determining information about the incident. Processing may then continue to step 214.

At step 214, processing system 30 may determine whether the incident is over, based on the received and processed information. For example, in some embodiments, certain types of responders may be able to provide an input to an electronic device or other notification indicating that an incident is over. If the incident is over, users of communication devices within the sub-region and responders 40 may be provided with notification, communication devices within the sub-region may exit the incident mode, and the incident may end. If the incident has not ended, processing may continue to step 216.

At step 216, the processing system may generate updates based on the received and processed data and information. As described herein, the processing station 30 may generate various types of updates, such as modifying the sub-regions that are impacted by the incident (e.g., allowing some communication devices to exit the incident mode, providing notifications that the incident mode is being exited, and causing other communication devices to enter into the incident mode), may update options that are available to communication devices within the sub-region in the incident mode, and may provide information to responders about the incident and locations of other responders. Once the updates have been generated, processing may continue to step 218.

At step 218, the incident updates may be transmitted to the communication devices within the sub-region and to the responders 40. The communication devices and responders 40 may update the information provided to users and the operation of monitoring equipment based on the updates, and processing may return to step 208 to collect additional data from the communication devices within the sub-region and from responders 40.

Figure 3:
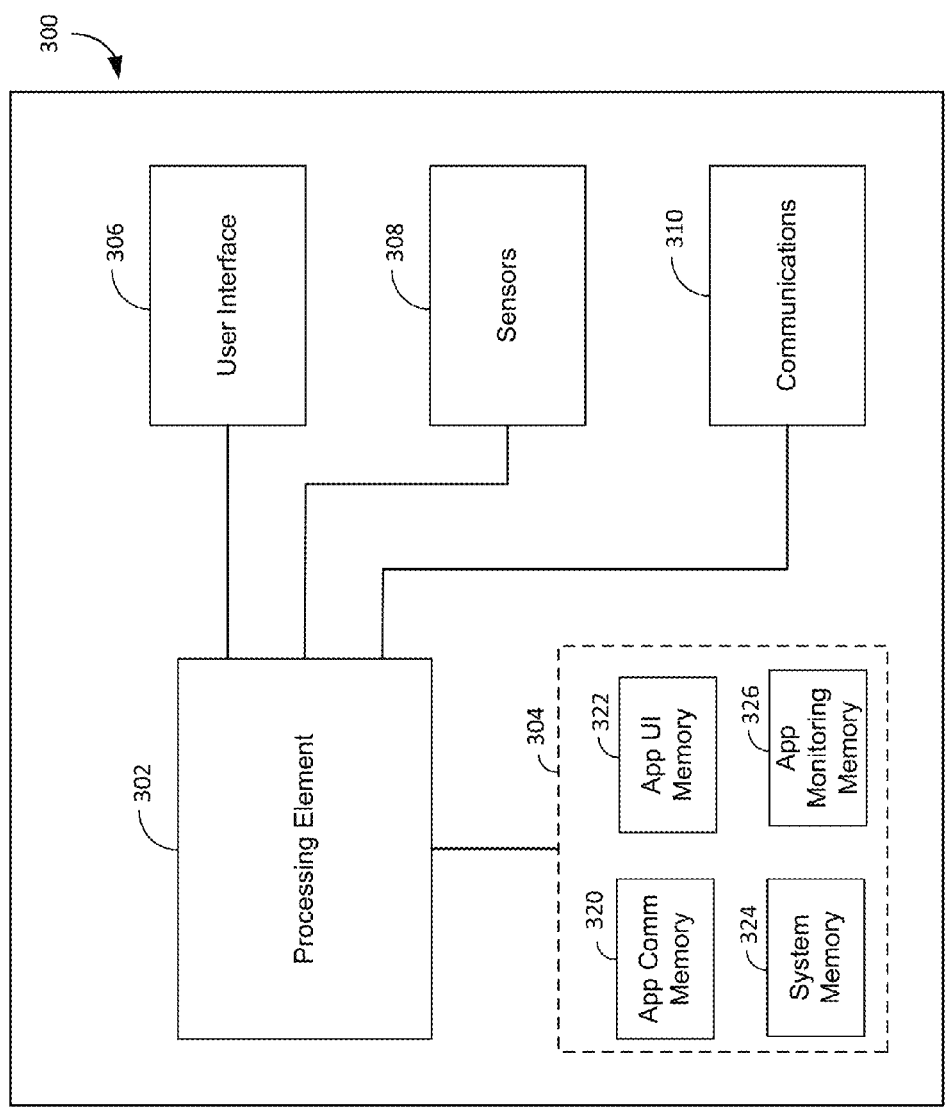
FIG. 3 depicts an illustrative block diagram of an illustrative observer communication device in accordance with some embodiments of the present disclosure.

FIG. 3 depicts a block diagram of an exemplary observer communication device 300 in accordance with some embodiments of the present disclosure. Although particular components are depicted in a particular arrangement in FIG. 3, it will be understood that observer communication device 300 may include additional or fewer components, that components thereof may be rearranged in any suitable manner, and one or more components may be implemented on one or more other devices. Although an observer communication device may be any suitable device that is capable of communicating using any suitable communication interface, in an exemplary embodiment the observer communication device 300 may be an electronic device running an operating system and applications, such as a smart watch, smart phone, phablet, tablet, augmented reality lenses, laptop, or desktop. In an embodiment, the observer communication device may include a processing element 302, memory 304, a user interface 306, sensors 308, and communications interfaces 310.

Processing element 302 may include any suitable processors, hardware, memory, or other components that perform the processing functionality described herein. The processing element 302 may execute software instructions in machine readable form on a tangible non-transitory computer readable storage medium, which may be accessed from any suitable memory (e.g., memory 304). In some embodiments, certain functionality of processing element may be implemented as hardware logic (e.g., software-designed hardware such as hardware description language (HDL) hardware that implements functionality described by the HDL software), computer readable instructions running on a processor, or any suitable combination thereof.

Memory 304 may include any suitable tangible or non-transitory storage medium that stores information, but does not include transient or propagated signals. Memory 304 may be any suitable memory device or combination thereof, such as flash memory, disks, ROM, EPROM, EEPROM, RAM, SRAM, optical or magnetic storage devices, or any other non-transitory medium that stores information that is accessed by a processor or computing device. In an embodiment, memory 304 may include a plurality of sets of instructions, including system instructions 324, application communication instructions 320, application user interface instructions 322, and application monitoring instructions 326. As described herein, in an embodiment system instructions 324 may include general instructions for the observer communication device 300 such as an operating system, application program interfaces (APIs) for interacting with applications and programs, and instructions for controlling the various components of the observer communication device 300 (e.g., APIs allowing applications to control user interface 306, sensors 308, and communications interfaces 310). The functionality of the incident mode may be implemented through an application program, which may include a plurality of software components such as application communication instructions 320, application user interface instructions 322, and application monitoring instructions 326. Although the instructions of the incident mode application are described herein as implementing different functionality with different instructions, it will be understood that the instructions of the incident mode application may be implemented as an integrated application or separate portions or subroutines.

User interface 306 may include user interface components such as a touchscreen, display, keyboard, mouse, voice recognition, buttons, biometric readers, gesture recognition, augmented reality display, any other suitable user interface components, or any combination thereof. In an embodiment, the user interface 306 may include at least some form of display (e.g., a screen of a smart watch or smart phone, or a display of an augmented reality device) that may provide specific information to an observer while in the incident mode, as well as some form of user input (e.g., a touchscreen of a smart watch or smart phone, or gesture recognition of an augmented reality device) to allow the user to provide responses and other information that may be transmitted to monitoring station 30.

Sensors 308 may include various types of components and devices such as video cameras, microphones, biometric sensors, time-of-flight sensors, accelerometers, gyroscopes, environmental sensors (e.g., temperature, barometric pressure, humidity, etc.), physiological sensors (e.g., heart rate, blood pressure, pulse, etc.), any other suitable sensors, or any combination thereof. In an embodiment, the sensors 308 may include sensors that allow for the observer communication device 300 to provide remote monitoring of the incident, such as video cameras and audio sensors of smart phone or augmented reality device.

Communications interfaces 310 may include wireless and wired interfaces for communicating locally and over a network such as a cellular communications network or the internet. Exemplary wireless interfaces may include WiFi, cellular, Bluetooth, near field communications (NFC), infrared, radio, satellite, any other suitable wireless communication interface, or any combination thereof. Exemplary wired communication interfaces may include Ethernet, USB, Firewire, telephone lines, DSL, cable connections, fiber optics, any other suitable wired communication interface, or any combination thereof. In an embodiment, an observer communication device may include cellular, WiFi, Bluetooth and USB communications interfaces 310.

In some embodiments, application communication instructions 320 may include instructions for the incident mode application to receive communications indicating that the incident mode should be initiated and to restrict and control the operations of communication interfaces 310 and other applications running on the observer communication device 300 in response to the incident mode. Incident mode messages may be received at one or more of communications interfaces 310, and the processing element 302 may determine the response to the incident mode messages based on the application communication instructions 320. In an embodiment, that response may include shutting down a subset of communication interfaces 310 or prohibiting the communication of information from some or all applications other than the incident mode application. In some embodiments, the application communication instructions 320 may cause processing element 302 to stop the execution of some or all other applications, preventing those applications from communicating over communication interfaces 310, from consuming battery power, or from using processing and memory resources. In an embodiment, application communication instructions 320 may also include instructions for transmitting user inputs and monitored information to a monitoring station 30, through communications interfaces 310.

In some embodiments, application user interface (UI) instructions 322 may include instructions for controlling the user interfaces 306 in response to the incident mode. The options that are presented to an observer may be modified based on the initiation of the incident mode and the type of incident. In an embodiment, application UI instructions 322 may cause a user interface 306 component (e.g., a display) to provide information indicating that the incident is occurring, information about the incident (e.g., a description of assailants), instructions relating to the incident (e.g., to stay or remain at a location), options for providing information about an incident (e.g., description of assailants, information about observers in the area, information relating to gunshots and injuries), and other available functionality (e.g., a limited interface for contacting emergency personnel). In an embodiment, the user interface for the incident mode may be the only user interface that is available to the operator, such that the operator is not permitted to access other programs or applications of the operator communications device 300. Application UI instructions 322 may include instructions for processing inputs received from user interfaces 306, in order to determine whether information should be provided to a monitoring station 30 and in order to prepare the information to be provided to monitoring station 30.

In some embodiments, application monitoring instructions 326 may include instructions for operating one or more of sensors 308 in order to provide monitoring about an incident. In response to the initiation of the incident mode, the application monitoring instructions 326 may cause the override of other functionality of one or more sensors that are useful for providing monitoring of incident. In an embodiment, these sensors (e.g., cameras, microphones, and GPS) may be employed to monitor for information about an incident. In some embodiments, application monitoring instructions 326 may include instructions for performing pre-processing of data received from some or all of the sensors (e.g., identifying a gunshot from a microphone signal and creating gunshot notification message including a timestamp and GPS location, or performing image analysis to identify persons of interest from a video feed). The sensors 308 may also provide information about the observer, such as physiological measurements that may be used to identify injuries or the proximity to an incident (e.g., based on changes in physiological measurements). The raw feeds and/or pre-processed data may be provided to monitoring station 30.

Figure 4:
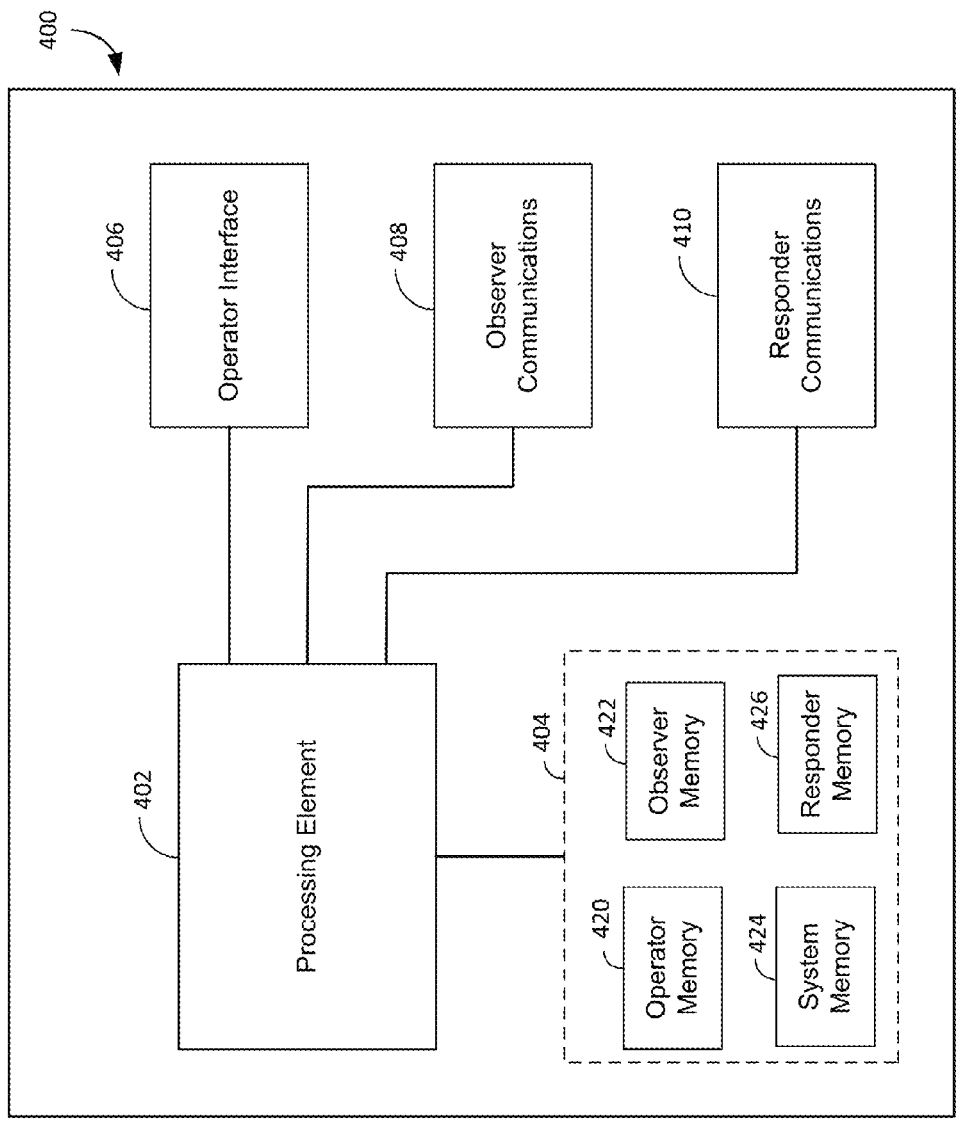
FIG. 4 depicts an illustrative block diagram of an illustrative monitoring station in accordance with some embodiments of the present disclosure.

FIG. 4 depicts a block diagram of an exemplary monitoring system 400 of a monitoring station in accordance with some embodiments of the present disclosure. Although particular components are depicted in a particular arrangement in FIG. 4, it will be understood that monitoring system 400 may include additional or fewer components, that components thereof may be rearranged in any suitable manner, and one or more components may be implemented on one or more other devices. Although a monitoring system 400 may be any suitable system that is capable of monitoring and responding to incidents, in an exemplary embodiment the monitoring system 40 may be a computer operating at a monitoring station 30, which may be in communication with other computing devices such as servers to implement the functionality described herein. Although the functionality of the monitoring system 400 may be described herein as being executed by a single computing device, it will be understood that any suitable functionality of the monitoring system 40 may be distributed over a plurality of devices, and in some embodiments, distributed over a plurality of monitoring stations. In an embodiment, the monitoring system 400 may include a processing element 402, memory 404, operator interface 406, observer communication interfaces 408, and responder communication interfaces 410.

Processing element 402 may include any suitable processors, hardware, memory, or other components that perform the processing functionality described herein. The processing element 402 may execute software instructions in machine readable form on a tangible non-transitory computer readable storage medium, which may be accessed from any suitable memory (e.g., memory 404). In some embodiments, certain functionality of processing element may be implemented as hardware logic (e.g., software-designed hardware such as hardware description language (HDL) hardware that implements functionality described by the HDL software), computer readable instructions running on a processor, or any suitable combination thereof.

Memory 404 may include any suitable tangible or non-transitory storage medium that stores information, but does not include transient or propagated signals. Memory 404 may be any suitable memory device or combination thereof, such as flash memory, disks, ROM, EPROM, EEPROM, RAM, SRAM, optical or magnetic storage devices, or any other non-transitory medium that stores information that is accessed by a processor or computing device. In an embodiment, memory 404 may include a plurality of sets of instructions, including system instructions 424, monitoring instructions 420, observer instructions 422, and responder instructions 326. As described herein, in an embodiment system instructions 424 may include general instructions for the monitoring system 400 such as an operating system, application program interfaces (APIs) for interacting with applications and programs, and instructions for controlling the various components of the monitoring system 300 (e.g., APIs allowing applications to operator interface 406, observer communication interfaces 408, and responder communication interfaces 410). In an embodiment, the monitoring system may be a specialized computing system for processing reports of incidents, processing information relating to incidents, determining information to be provided to an operator of the monitoring system 400, and determining information to be provided to an observers and responders.

Operator interface 406 may include user interface components such as a touchscreen, display, keyboard, mouse, voice recognition, buttons, biometric readers, gesture recognition, augmented reality display, any other suitable user interface components, or any combination thereof, that allow an operator of the monitoring system 400 to interact with the monitoring system 400. In an embodiment, the operator interface 406 may include a computing device having a touchscreen display, keyboard, mouse, and voice recognition, such that the operator can interact with the monitoring system in a variety of ways. In this manner, the monitoring system can process information and provide raw information, analyses, and statistics to an operator, such that an operator can control a response to incident. In some embodiments, the monitoring system may provide preliminary analyses of an incident, such as a predicted area for a sub-region or descriptive information relating to the incident. The operator may then modify or adjust the preliminary analysis, for example, by modifying a map display to adjust a sub-region for the incident.

Observer communications interfaces 408 may include wireless and wired interfaces for communicating with observers over a network such as a cellular communications network or the internet. Exemplary wireless interfaces may include WiFi, cellular, radio, satellite, any other suitable wireless communications interface, or any combination thereof. Exemplary wired communications interfaces may include Ethernet, telephone lines, DSL, cable connections, fiber optics, any other suitable wired communications interface, or any combination thereof. In an exemplary embodiment, observer communications interfaces 408 may provide a high-speed direct connection to communications networks such as cellular networks and the internet to facilitate a high volume of communications with observers.

Responder communications interfaces 410 may include wireless and wired interfaces for communicating with responders over a network such as a cellular communications network, the internet, or a dedicated communication channel. Exemplary wireless interfaces may include WiFi, cellular, radio, satellite, any other suitable wireless communications interface, or any combination thereof. Exemplary wired communications interfaces may include Ethernet, telephone lines, DSL, cable connections, fiber optics, any other suitable wired communications interface, or any combination thereof. In an exemplary embodiment, responder communications interfaces 408 may provide a dedicated communication channel to responders, for example, via cellular networks, satellite/radio communications, and remotely operated intelligence, surveillance, and reconnaissance communication drones. In some embodiments, one or more of observer communications interfaces 408 and responder communications interfaces 410 may be shared for both observer and responder communications (e.g., a cellular or internet connection).

In some embodiments, monitoring instructions 420 may include instructions for the monitoring system 400 to perform operations including processing incoming notifications and monitoring information, interacting with an operator through the operator interface 406, identifying a sub-region, and determining information about an incident (e.g., information about assailants, observers, injuries, etc.). As described herein, notifications regarding an incident may be received via observer communications interfaces 408 and responder communications interfaces 410, and may include information such as phone calls, text messages, e-mails, social media feeds, gunshot sensors, and surveillance equipment. In some embodiments, aspects of this information may be automatically analyzed based on processing element 402 executing monitoring instructions to extract information such as location of an incident from the received notifications. In this manner, the monitoring system may provide an automated analysis of the location of a sub-region where an incident is occurring, and in some embodiments, may provide a preliminary analysis that may be modified by an operator via operator interface 406. The monitoring instructions 420 may also include instructions for determining information about an incident such as information about assailants and injuries to observers based on received data. In some embodiments, the monitoring instructions 420 may facilitate the automated analysis of the incoming information (e.g., based on known inputs from an incident mode application running on observer communication devices 300, based on automated analysis of video and audio feeds, etc.). In some embodiments, information or analysis may be provided to the operator via operator interface 406 for further analysis.

In some embodiments, observer communications instructions 422 may include instructions for communicating with observer communication devices 300 via observer communications interfaces 408 and for determining the content of incident mode messages to be transmitted to the observer communications devices. As described herein, observer communication devices 300 may provide information such as notifications, observer responses to the incident mode application, and monitoring information from the incident mode application. The monitoring system 400 may provide information within incident mode messages. The observer communications instructions 422 may determine the content of these communications and the communications medium for exchanging these communications. For example, the observer communications instructions may access information about the incident (e.g., as determined by monitoring instructions 420) and generate incident messages for observer communications devices 300. In an embodiment, the incident messages may be differentiated based on characteristics such as the type of communication device, the proximity of the observer to the incident, and the identity of the observer. In some embodiments, the observer communications instructions may also determine whether information should be transmitted over a particular communications medium (e.g., if cellular communications channels are busy, certain communications may only be exchanged via an internet connection).

In some embodiments, responder communications instructions 426 may include instructions for communicating with responder devices 500 via responder communications interfaces 410 and for determining the content of incident mode messages to be transmitted to the responder communications devices 500. As described herein, responder devices 500 may provide information such as responder notifications, responder data while responding to an incident, monitoring feeds from responders, and other information relevant to the incident. The monitoring system 400 may provide information to the responder devices 500 such as information about assailants, observers, gunshots, injuries, and other responders. In some embodiments, information for generating a descriptive display may be provided by monitoring system 400. In some embodiments, this information may include an overlay of information relating to assailants, observers, gunshots, injuries, and other responders over a map region. The responder communications instructions 422 may perform initial processing on incoming information from responders and may also determine this information that is transmitted to responders. In an embodiment, messages may be differentiated based on characteristics such as the type of communication device, the proximity of the responder to the incident, and the type of responder. In some embodiments, the responder communications instructions 426 may also determine whether information should be transmitted over a particular communications medium (e.g., if cellular communications channels are busy, certain communications may only be exchanged via an internet connection, or dedicated communications paths such as through a mobile communication system (e.g., communications drones, vans, etc.)).

Figure 5:
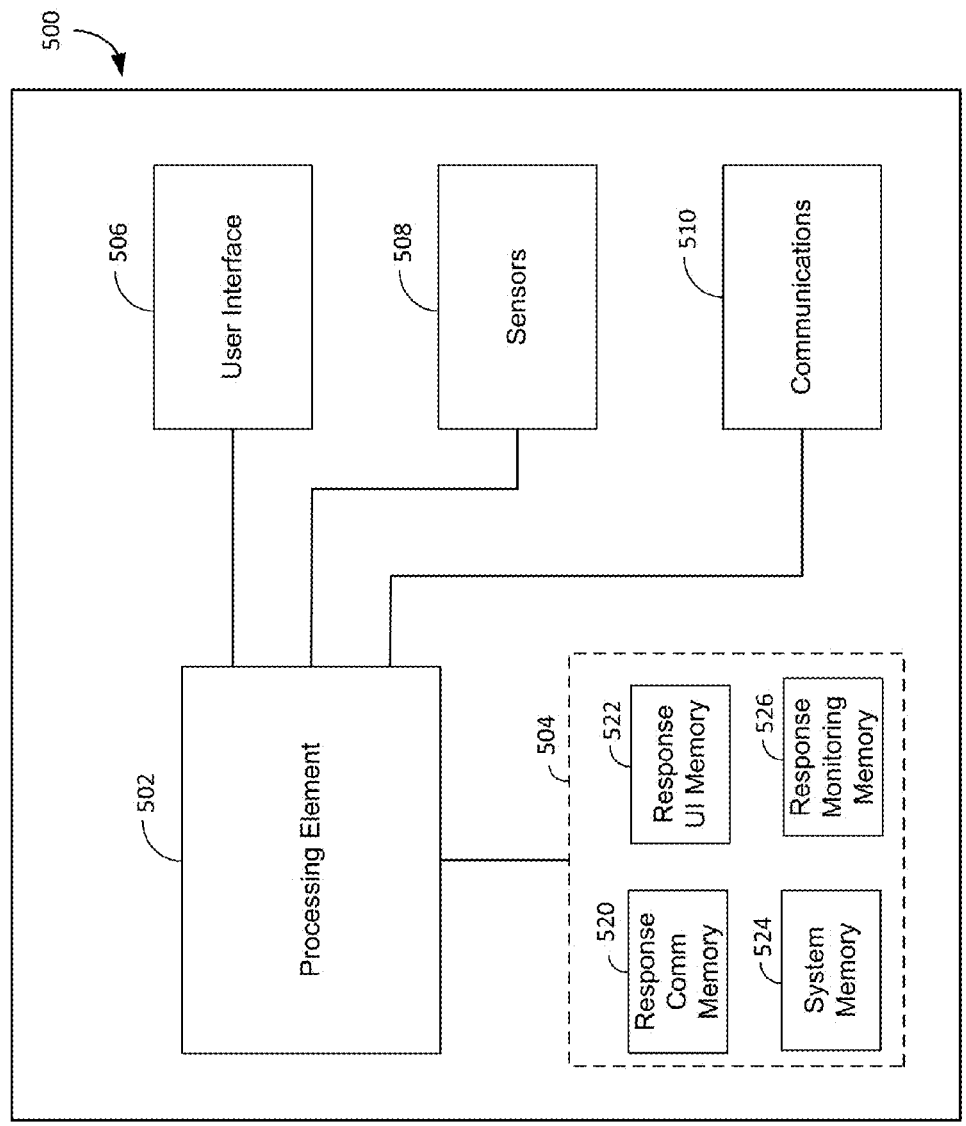
FIG. 5 depicts an illustrative block diagram of an illustrative responder device in accordance with some embodiments of the present disclosure.

FIG. 5 depicts a block diagram of an exemplary responder device 500 in accordance with some embodiments of the present disclosure. Although particular components are depicted in a particular arrangement in FIG. 5, it will be understood that responder device 500 may include additional or fewer components, that components thereof may be rearranged in any suitable manner, and one or more components may be implemented on one or more other devices. Although a responder device may be any suitable device that is utilize by a responder such as law enforcement, medical personnel, fire fighters, SWAT, or military, in an exemplary embodiment the responder device 500 may be an electronic device running an operating system and applications, such as a smart watch, smart phone, phablet, tablet, augmented reality lenses, laptop, or desktop. In an embodiment, the responder device may include a processing element 502, memory 504, a user interface 506, sensors 508, and communications interfaces 510.

Processing element 502 may include any suitable processors, hardware, memory, or other components that perform the processing functionality described herein. The processing element 502 may execute software instructions in machine readable form on a tangible non-transitory computer readable storage medium, which may be accessed from any suitable memory (e.g., memory 504). In some embodiments, certain functionality of processing element may be implemented as hardware logic (e.g., software-designed hardware such as hardware description language (HDL) hardware that implements functionality described by the HDL software), computer readable instructions running on a processor, or any suitable combination thereof.

Memory 504 may include any suitable tangible or non-transitory storage medium that stores information, but does not include transient or propagated signals. Memory 504 may be any suitable memory device or combination thereof, such as flash memory, disks, ROM, EPROM, EEPROM, RAM, SRAM, optical or magnetic storage devices, or any other non-transitory medium that stores information that is accessed by a processor or computing device. In an embodiment, memory 504 may include a plurality of sets of instructions, including system instructions 524, responder communication instructions 520, responder user interface instructions 522, and responder monitoring instructions 526. As described herein, in an embodiment system instructions 524 may include general instructions for the responder device 500 such as an operating system, application program interfaces (APIs) for interacting with applications and programs, and instructions for controlling the various components of the responder device 500 (e.g., APIs allowing applications to control user interface 506, sensors 508, and communications interfaces 510). The functionality of the responder device may be implemented through an application program, which may include a plurality of software components such as application communication instructions 520, application user interface instructions 522, and application monitoring instructions 526. Although the instructions of the incident mode application are described herein as implementing different functionality with different instructions, it will be understood that the instructions of the incident mode application may be implemented as an integrated application or separate portions or subroutines.

User interface 506 may include user interface components such as a touchscreen, display, keyboard, mouse, voice recognition, buttons, biometric readers, gesture recognition, augmented reality display, any other suitable user interface components, or any combination thereof. In an embodiment, the user interface 506 may include at least some form of display (e.g., a screen of a smart watch or smart phone, or a display of an augmented reality device) that may provide specific information to a responder while in the incident mode, as well as some form of user input (e.g., a touchscreen of a smart watch or smart phone, or gesture recognition of an augmented reality device) to allow the user to control display and menus of the responder device, control communications with other responders, and communicate with the monitoring station 50. In some embodiments, user interface 506 may also facilitate communications with other responder equipment (e.g., law enforcement or medical equipment) to control aspects of operations of that equipment.

Sensors 508 may include various types of components and devices such as video cameras, microphones, biometric sensors, time-of-flight sensors, accelerometers, gyroscopes, environmental sensors (e.g., temperature, barometric pressure, humidity, etc.), physiological sensors (e.g., heart rate, blood pressure, pulse, etc.), infrared sensors, any other suitable sensors, or any combination thereof. In an embodiment, the sensors 508 may allow for the responder device 500 to access information that may be used to directly update a display of the responder device 500, to provide remote monitoring of the incident for the monitoring station 30, to provide information to other responder equipment, and to control the operations of other responder equipment.

Communications interfaces 510 may include wireless and wired interfaces for communicating locally and over a network such as a cellular communications network or the internet. Exemplary wireless interfaces may include WiFi, cellular, Bluetooth, near field communications (NFC), infrared, radio, satellite, any other suitable wireless communication interface, or any combination thereof. In some embodiments, short- and medium-range wireless interfaces may facilitate communications between responders, while cellular and other long-range interfaces may be used for communications with a monitoring station 30. In some embodiments, the responder device may also include wired interfaces that may periodically connect to a wired interface such as Ethernet, USB, Firewire, telephone lines, DSL, cable connections, fiber optics, any other suitable wired communication interface, or any combination thereof.

In some embodiments, responder communication instructions 520 may include instructions for the responder device 500 to communicate with the monitoring station 30 via communications interfaces 510, to communicate with other responder devices 500 via communications interfaces 510, and to process information that is sent and received during these communications. The responder communication instructions 520 may process incoming data from the monitoring station 30 or other responder devices 500, analyze the data, and prepare the data for use by responder device 500. The responder communication instructions may also analyze and format data for transmission to the monitoring station 30 and other responder devices 500. In some embodiments, such analysis and formatting may include a preliminary determination of whether certain data should be transmitted to a monitoring station or another responder device 500 (e.g., a preliminary analysis of an audio signal that determines that gunshots may have been heard in the area, or a comparison of environmental or physiological information to a threshold). In some embodiments, responder communication instructions may also include instructions for determining the appropriate communications interface for handling certain types of communications, for example, based on channel traffic and interference.

In some embodiments, responder user interface (UI) instructions 522 may include instructions for controlling the user interfaces 506 of the responder device 500. The options that are presented to a responder may be modified based on the information received from the monitoring station 30 and other responder devices 50. In an embodiment, responder UI instructions 522 may cause a user interface 506 component (e.g., a display) to provide information indicating that the incident is occurring, information about the incident (e.g., a description of assailants, observers, gunshots, injuries, and other responders), a descriptive display for the incident (e.g., a visual display depicting information about the incident over a map of the sub-region), options for providing information about an incident (e.g., description of assailants, information about other responders in the area, information relating to gunshots and injuries), and other available functionality (e.g., communication interfaces for contacting other responders, responder equipment that may be controlled through the user interface, physiological measurements for the responder, etc.). Responder UI instructions 522 may include instructions for processing inputs received from user interfaces 506, in order to determine whether information should be provided to a monitoring station 30 and other responder devices 500, and in order to prepare the information to be provided to monitoring station 30 and other responder devices 500.

In some embodiments, responder monitoring instructions 526 may include instructions for operating one or more of sensors 508 in order to provide monitoring about an incident. In response to the communications from the monitoring station 30 or an input at user interface 506, the responder monitoring instructions 526 may cause one or more sensors to acquire data that is useful for providing monitoring of incident. In an embodiment, these sensors (e.g., cameras, microphones, and GPS) may be employed to monitor for information about an incident. In some embodiments, responder monitoring instructions 526 may include instructions for performing pre-processing of data received from some or all of the sensors (e.g., identifying a gunshot from a microphone signal and creating gunshot notification message including a timestamp and GPS location, or performing image analysis to identify persons of interest from a video feed). The sensors 308 may also provide information about the responder, such as physiological measurements that may be used to identify injuries or the proximity to an incident (e.g., based on changes in physiological measurements). The raw feeds and/or pre-processed data may be provided to monitoring station 30.

Figure 6:
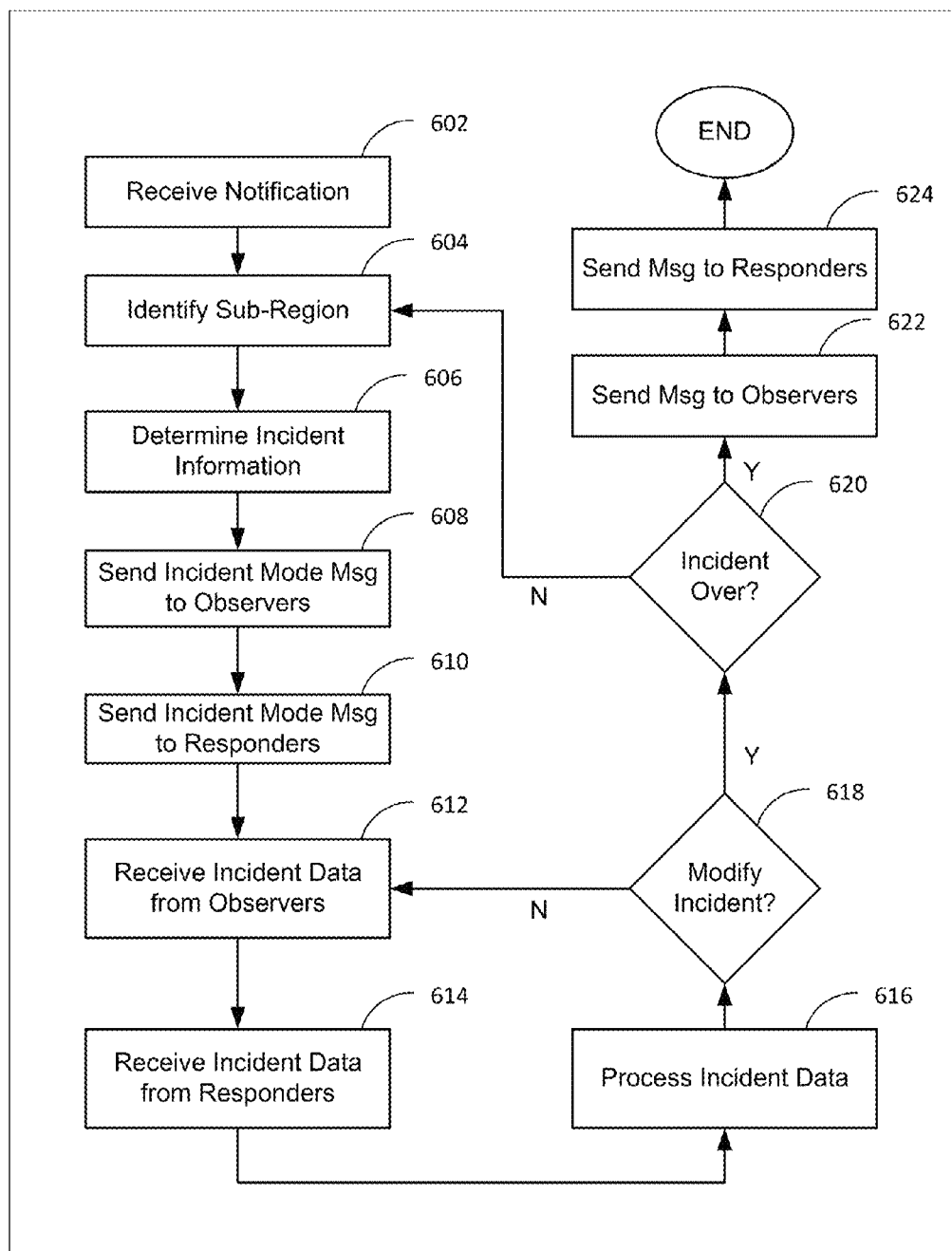
FIG. 6 depicts illustrative steps for operating an illustrative observer communication device in accordance with some embodiments of the present disclosure.

FIG. 6 depicts exemplary steps for a monitoring station 30 of an incident monitoring and response system 1 to identify incidents and communicate with observers and responders in accordance with some embodiments of the present disclosure. The steps of FIG. 6 are provided in an exemplary sequence and flow, and it will be understood that some steps may be inserted or removed, and that a different flow and steps may be implemented.

At step 602, a monitoring station 400 may receive notifications through communications interfaces such as observer communications interfaces 408 and responder communications interfaces 410. As described herein, notifications include information such as electronic communications (e.g., e-mail and text messages), phone calls, inputs of the specialized applications, feeds from surveillance equipment, communications from gunshot sensor, and notifications from any other suitable equipment that is useful for determining whether an incident is occurring within an area. Processing element 402 may execute instructions (e.g., monitoring instructions 420) to process these notifications. In some embodiments, information from the notifications may be compiled into a common data format that may be analyzed by a computing system (e.g., processing element 402 executing monitoring instructions 420 and one or more other computers of the monitoring station 30 or incident monitoring and response system 1) and by an operator (e.g., based on processing element 402 executing monitoring instructions 420 and interfacing with a display and user interface of operator interface 406). Once the notifications have been received and processed, processing may continue to step 604.

At step 604, processing element 402 may execute instructions (e.g., monitoring instructions 420) to identify a sub-region of the monitored region 10 in which an incident is occurring. The sub-region may be identified by monitoring station 400, other computing systems of the monitoring station 30 or incident monitoring and response system 1, by an operator of the monitoring system 400, or any combination thereof. In an exemplary embodiment, the sub-region may be associated with a portion of a grid system overlaying the monitored region 10. Once a sub-region has been identified, processing may continue to step 606.

At step 606, processing element 402 may execute instructions (e.g., monitoring instructions 420) to determine information about the incident. As described herein, notifications may be provided from a number of different sources and types of sources. This information may be compiled to be analyzed by monitoring system 400, other computing systems of monitoring station 30 or incident monitoring and response system 1, one or more operators at monitoring station 30, or any combination thereof. Based on this wide variety of information, information about the incident may be determined, such as locations of assailants, locations of bystanders, locations of responders, number of assailants, assailant descriptions, presence of gunshots, injuries, severity of injuries, locations of available responders, any other suitable information, or any combination thereof. Once this information is determined, processing may continue to step 608.

At step 608, processing element 402 may execute observer instructions 422 to provide incident mode messages to observers via observer communications interfaces 408. In some embodiments, different incident mode messages may be tailored to different observers based on factors such as location within a sub-region, demographic information about the observer, available resources within a communication device (e.g., for monitoring), and other relevant information relating to the observer and their relation to the incident. Incident mode messages may include instructions to disable or modify the functionality of certain applications and communication resources, to generate a custom user interface and audio for reporting information about the incident, and to establish monitoring feeds using resources of communications devices. Once the incident mode messages have been transmitted to the observers within the sub-region of the monitored region 10, processing may continue to step 610.

At step 610, processing element 402 may execute responder instructions 426 to generate and send incident mode messages to responders. Incident mode messages may be tailored to responders based on information such as the type of responder (e.g., police officer, SWAT team, military, medical, emergency medical) and information about the incident (e.g., proximity to the incident, type of incident, severity of incident, number of injuries at the incident, types of injuries at the incident). The incident mode messages may provide information for an enhanced display and user inputs to be provided to responders, for example, a display showing locations of assailants, locations of observers, injuries, types of injuries, locations of responders, descriptive information for assailants and observers, and other information relating to the incident. In some embodiments, this information may be provided in an interactive visual descriptive display that overlays a map of the sub-region. The provided user interface may also allow for entry of specialized information relating to the incident as described herein. Once the incident mode messages have been sent to responders in the sub-region or in a suitable area relative to the sub-region, processing may continue to step 612.

At step 612, monitoring system 400 may receive data from observers via observer communications interfaces 408, and processing element 402 may execute instructions of observer instructions 422 to process the received data. In an embodiment, the received data may include inputs provided by observers using the specialized user interface, as well as monitored information from the communication devices of the observers (e.g., video feeds, audio feeds, and analysis of video and audio feeds, such as identification of gunshots). The received data may be processed and formatted for analysis, and processing may continue to step 614.

At step 614, incident data may be received from responders via responder communications interfaces 410, and may be processed by processing element 402 executing instructions of responder instructions 426. Received data from responders may include inputs to a specialized interface, data such as GPS data, visual and audio feeds from monitoring equipment, and automated reporting from responder devices (e.g., weapons and medical equipment). The received data may be processed and formatted for analysis, and processing may continue to step 616.

At step 616, processing element 402 of monitoring system 400 may execute monitoring instructions 420 to process the received incident data. Information about the received incident data may be analyzed in an automated manner, by one or more operators (e.g., using operator interface 406), or by a combination thereof. Based on this processing, the sub-region of the monitored region 10 may be updated, parameters for the incident mode for operators may be updated, and parameters for the incident mode for the responders may be updated. In addition, it may also be determined that an incident is over, such that instructions may be provided to observers and responders, and observer communication devices may be instructed to exit the incident mode. Once the incident data has been processed, processing may continue to step 618.

At step 618, processing element 402 of monitoring system 400 may execute monitoring instructions 420 and to determine whether an aspect of the incident should be updated, as determined by the processing of step 616. If incident information should not be updated, processing may return to step 612, allowing monitoring system 400 to receive additional incident data from observers and responders, and to continue to process the data. If the incident information should be updated, processing may continue to step 620.

At step 620, processing element 402 of monitoring system 400 may execute monitoring instructions 420 to determine whether an incident is over. If the incident is not over, and new incident mode information is to be provided to the operator and/or the responders, processing may return to step 604. If the incident is over, processing may continue to step 622.

At step 622, processing element 402 of monitoring system 400 may execute observer instructions 422 to communicate messages indicating that the incident is over to observers via observer communications interfaces 408. The messages may include information relating to the incident and instructions for leaving the sub-region. In some embodiments, the information may also include further user input/output options together with follow-up information about the incident. Once the messages have been sent to the observers, processing may continue to step 624.

At step 624, processing element 402 of monitoring system 400 may execute responder instructions 426 to communicate a messages indicating that the incident is over to responders over responder communications interfaces 410. The message may include information such as information describing the incident, information relating to further responder response to the incident, information relating to instructions as to how to exit the sub-region, any other suitable information, or any combination thereof. In some embodiments, the message may also include additional input/output for the responders to provide additional information about the incident. Once the messages have been sent to the responders, the processing may end.

Figure 7:
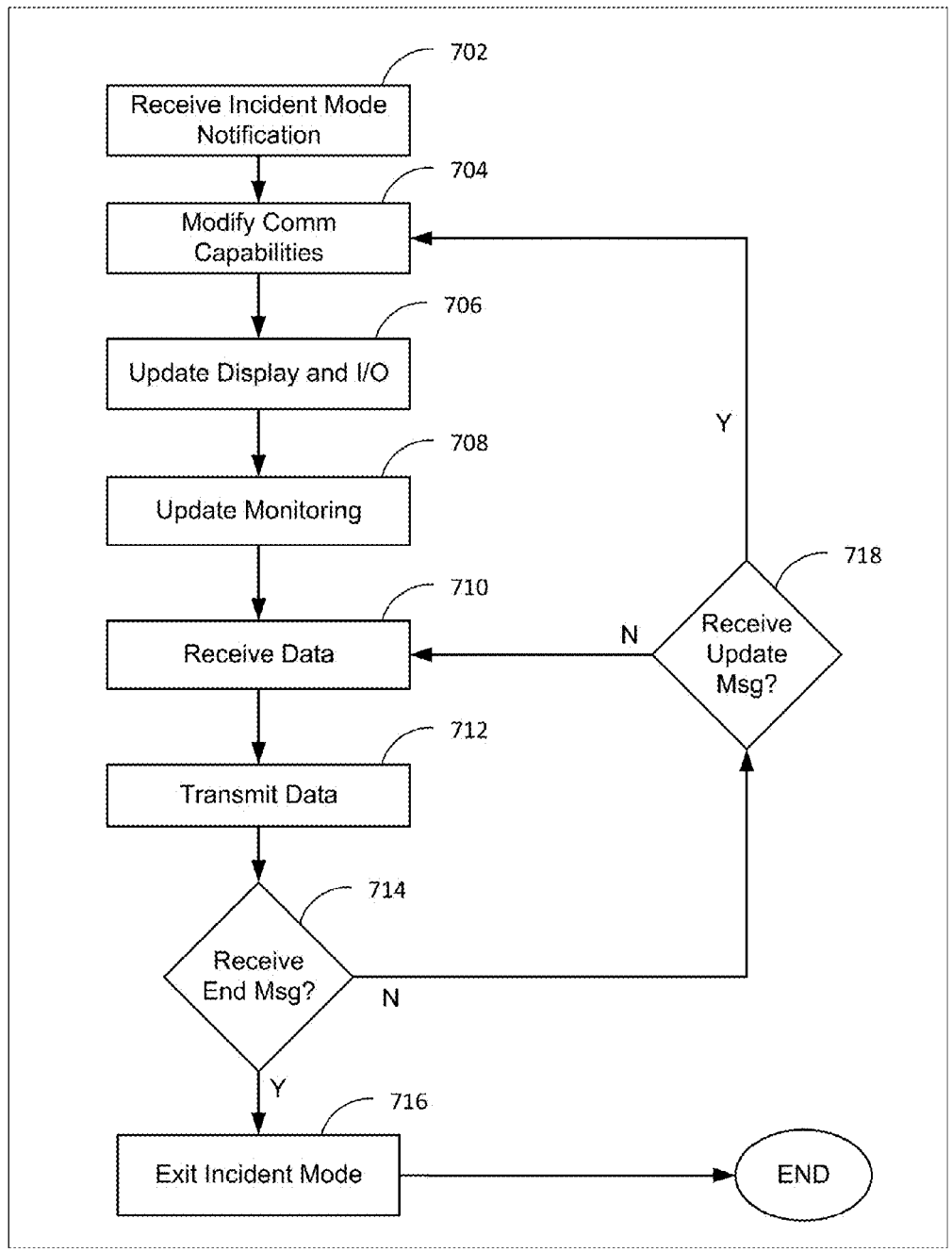
FIG. 7 depicts illustrative steps for operating an illustrative monitoring station in accordance with some embodiments of the present disclosure.

FIG. 7 depicts exemplary steps for operating an observer communication device in an incident mode in accordance with some embodiments of the present disclosure. The steps of FIG. 7 are provided in an exemplary sequence and flow, and it will be understood that some steps may be inserted or removed, and that a different flow and steps may be implemented.

At step 702, processing element 302 of observer communication device 300 may execute instructions of application instructions 320 to receive an incident mode notification via communications interfaces 310. The incident mode notification may be received as a message or a set of related messages that include instructions for the observer communication device 300 to operate in the incident mode. In an embodiment, the incident mode may control the operation of communications interfaces 310 and applications, may dictate the display available at user interface 306, and may operate sensors 308 in order to provide monitoring. Once the incident mode notification has been received, processing may continue to step 704.

At step 704, processing element 302 of observer communication device 300 may execute communication instructions 320 in order to control the operations of communications interfaces 310. Based on the incident mode notification, some or all of communications interfaces such as cellular, Wi-Fi, Bluetooth, Near Field communications ("NFC"), Ethernet, USB, FireWire, and other communications interfaces, may be modified such that they are either disabled or limited such that only certain communications are permitted to be exchanged via the communications interface (e.g., communications from the incident mode application). For example, in an embodiment, only communications from the incident mode application may be transmitted via communications interfaces 310 and all communications interfaces except for SMS, Wi-Fi, and Ethernet may be disables. Once the operation of the communications interfaces 310 has been modified, processing may continue to step 706.

At step 706, processing element 302 of observer communication device 300 may execute user interface instructions 322 to update the operation of user interface 306 based on the incident mode notification. As described herein, the user interface 306 may be modified such that some or all applications other than the incident mode application are inaccessible via user interface 306. User interface 306 may also be modified to depict the incident mode application, which may provide information such as information about the incident, information about assailants, instructions for observers, personalized instructions for observers in a certain area, and specific questions and interfaces to facilitate observers providing information relating to the incident. Once the user interface 306 has been updated, processing may continue to step 708.

At step 708, processing element 302 of observer communication device 300 may execute monitoring instructions 326 to modify the operation of sensors 308 based on the incident mode notification. In some embodiments, certain sensors (e.g., cameras and microphones) may be enabled in order to provide monitoring of the area where the observer is located. In some embodiments, the monitoring may only be enabled when a location (e.g., a GPS location) indicates that the observer is in an area approximate to the incident, or in response to an input at the user interface (e.g., the user interface 306 of the incident mode application). Once the monitoring performed by sensors 308 has been updated, processing may continue to step 710.

At step 710, processing element 302 of observer communication device 300 may execute user interface instructions 322 and monitoring instructions 326 to receive data from the user interface 306 and sensors 308. In some embodiments, some of the data received data may be processed at the observer communication device 300 in order to determine whether information should be provided to the monitoring system 300 and/or to provide preliminary analysis of the received data. For example, in an embodiment, audio data may be analyzed to determine if a gunshot has occurred in the area. Once the data has been received from the user interface 306 and sensors 308, processing may continue to step 612.

At step 712, processing element 302 of observer communication device 300 may execute the communication instructions 320 in order to transmit the received and processed data to the monitoring station 30 via communications interfaces 310. Once the data has been transmitted, processing may continue to step 714.

At step 714, processing element 302 of observer communication device 300 may execute communication instructions 320 to determine whether a message indicating that the incident mode is over has been received via communications interfaces 310. As described herein, a message may be provided that indicates that the incident mode is over, providing instructions for exiting the incident or summary information about the incident, and allowing the observer communication device 300 to exit the incident mode. If such a message has been received, processing may continue to step 716. If such a message has not been received, processing may continue to step 718.

At step 716, processing element 302 may execute communication instructions 320, user interface instructions 322, and monitoring instructions 326 to restore each of the user interface 306, sensors 308, and communications interfaces 310 to the normal mode. In some embodiments, information may also be provided to user interface 306 providing instructions, information, and information requests related to the end of the incident. In some embodiments, one or more messages may be sent via communications interfaces 310 indicating that an incident is over (e.g., a text message transmitted to individuals on an "in case of emergency" list). Once the incident mode has been exited, processing may end.

At step 718, processing element 302 of observer communication device 300 may execute communication instructions 320 to determine if an update message has been received via communications interfaces 310. An update message may provide changed parameters for any of user interface 306, sensors 308, and communications interfaces 310. If an update message has not been received, processing may return to step 710, in which data from the user interface 306 and sensors 308 may be received according to the existing parameters of the incident mode. If an update message has been received, processing may return to step 704, such that the operation of the user interface 306, sensors 308, and communications interfaces 310 may be updated.

Figure 8:
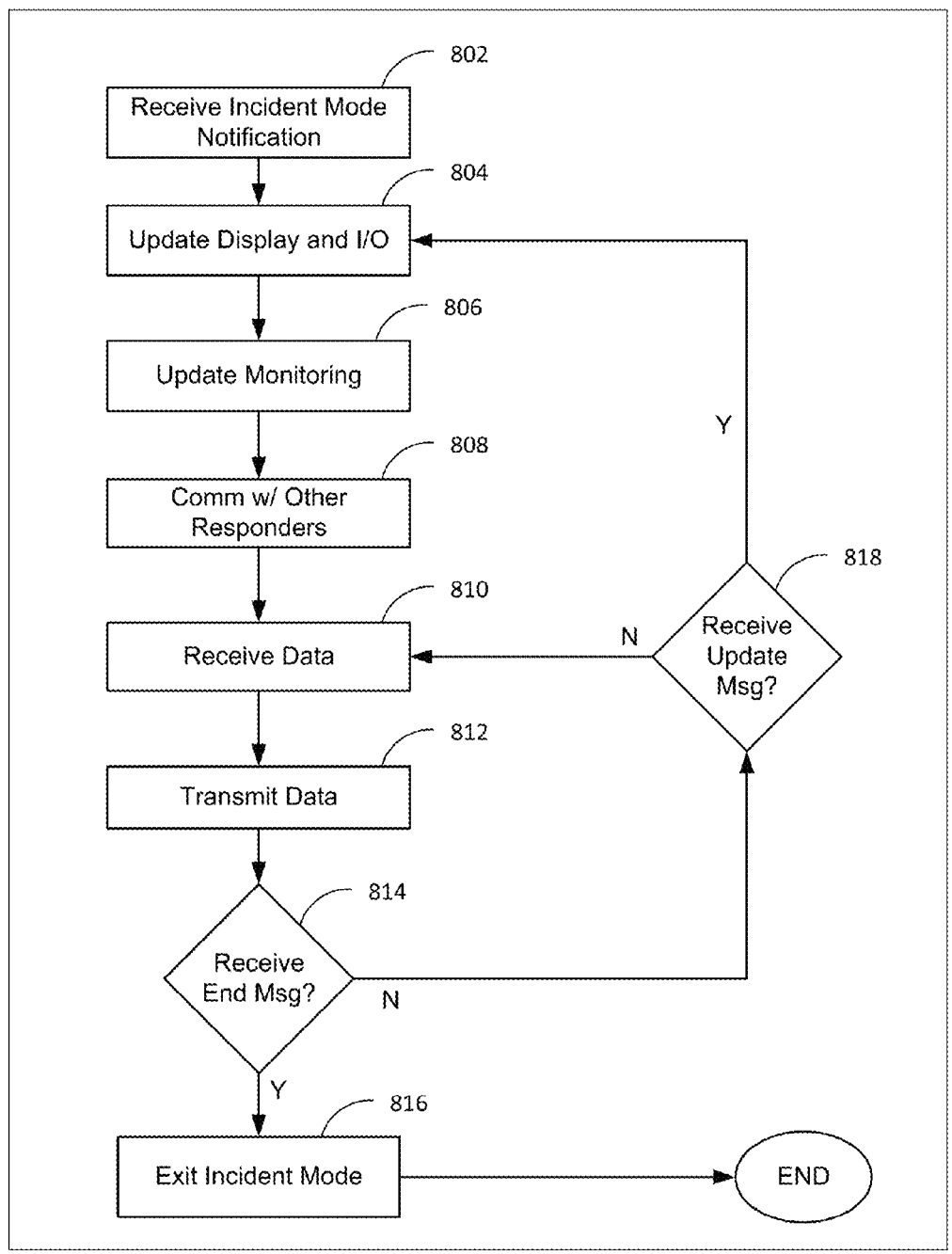
FIG. 8 depicts illustrative steps for operating an illustrative responder device in accordance with some embodiments of the present disclosure.

FIG. 8 depicts exemplary steps for operating a responder device in response to an incident in accordance with some embodiments of the present disclosure. The steps of FIG. 8 are provided in an exemplary sequence and flow, and it will be understood that some steps may be inserted or removed, and that a different flow and steps may be implemented.

At step 802, processing element 502 of responder device 500 may execute instructions of communication instructions 520 to receive communications from monitoring station 30 via communications interfaces 510. The communications may be received as a message or a set of related messages that include information about an incident for use by the responder device 500. In an embodiment, the responder device 500 may utilize information from the monitoring station 30 (and in some embodiments, from other responder devices 500) to control the display available at user interface 506, to operate sensors 508 (e.g., to assist responder and to provide monitoring to monitoring station 30), and to control the operation of communications interfaces 510. Once the incident information has been received, processing may continue to step 804.

At step 804, processing element 502 of responder device 500 may execute user interface instructions 522 to update the user interface 506 based on communications from the monitoring station 30 and other responder devices 500. As described herein, the user interface 506 may be modified to display information about an incident, to display information requests from the monitoring station 30 or other responder devices 50, to provide a rich descriptive display with information about an incident integrated into a map of the sub-region, and to enable other interfaces to control responder equipment and communicate with other responder devices 500. In an embodiment, the user interface 506 may initially display information about the incident (e.g., type of incident, assailant information, number of observers, and injuries) and a request that the responder indicate whether he will respond to the incident. If the responder answers yes, the responder device 500 may initiate the description display to provide information about the incident, and include other information such as links to engage in direct communications with other responders who are responding directly to the incident. Once the user interface 506 has been updated, processing may continue to step 806.

At step 806, processing element 502 of responder device 500 may execute monitoring instructions 526 to operation the sensors 508 in response to the incident. In some embodiments, certain sensors (e.g., cameras and microphones) may provide monitoring that may be transmitted to the monitoring station 30. In some embodiments, the monitoring may only be enabled when a location (e.g., a GPS location) indicates that the responder is in an area approximate to the incident of if the responder indicates that the monitoring should be provided (e.g., via user interface 506). Once the monitoring performed by sensors 508 has been updated, processing may continue to step 808.

At step 808, processing element 502 of responder device 500 may execute communication instructions 520 in order to communicate with other responder devices 500. Responder devices 500 may communicate information such voice, video, audio, location, and information regarding an incident via communication interfaces 510 such as cellular, radio, and satellite communication interfaces. In this manner, responder devices 500 for responders that are responding to an incident may communicate information about the incident in the background (e.g., without intervention from the responders) and responders may also communicate directly. Processing may then continue to step 810.

At step 810, processing element 502 of responder device 500 may execute user interface instructions 522 and monitoring instructions 526 to receive data from the user interface 506 and sensors 508. In some embodiments, some of the data received data may be processed at the responder device 500 in order to determine whether information should be provided to the monitoring system 500 and/or to provide preliminary analysis of the received data. For example, in an embodiment, audio data may be analyzed to determine if a gunshot has occurred in the area. Once the data has been received from the user interface 506 and sensors 508, processing may continue to step 612.

At step 812, processing element 502 of responder device 500 may execute the communication instructions 520 in order to transmit the received and processed data to the monitoring station 30 via communications interfaces 510. Once the data has been transmitted, processing may continue to step 814.

At step 814, processing element 502 of responder device 500 may execute communication instructions 520 to determine whether a message indicating that the incident is over has been received via communications interfaces 510. As described herein, a message may be provided that indicates that the incident is over, providing instructions for exiting the incident or summary information about the incident, and allowing the responder device 500 to respond to other incidents. If such a message has been received, processing may continue to step 816. If such a message has not been received, processing may continue to step 818.

At step 816, processing element 502 may execute communication instructions 520, user interface instructions 522, and monitoring instructions 526 to restore each of the user interface 506, sensors 508, and communications interfaces 510 to a mode in which the responder device is no longer responding to the incident. In some embodiments, information may also be provided to user interface 506 providing instructions, information, and information requests related to the end of the incident. In some embodiments, the responder devices 500 that were responding to the incident may cease communicating with each other, and background monitoring of sensors of responder devices may cease. Processing may end.

At step 818, processing element 502 of responder device 500 may execute communication instructions 520 to determine if an update message has been received via communications interfaces 510. An update message may provide changed parameters for any of user interface 506, sensors 508, and communications interfaces 510. If an update message has not been received, processing may return to step 810, in which data from the user interface 506 and sensors 508 may be received according to the existing parameters of the responder device 500. If an update message has been received, processing may return to step 804, such that the operation of the user interface 506, sensors 508, and communications interfaces 510 may be updated.

Figure 9:
FIG. 9 depicts an exemplary monitored region in accordance with some embodiments of the present disclosure.

FIG. 9 depicts an exemplary monitored region in accordance with some embodiments of the present disclosure. FIG. 9 depicts a portion 902 of a larger monitored region 10 (e.g., a jurisdictional area for a law enforcement entity). In an exemplary embodiment, portion 902 of the monitored region 10 may correspond to a display provided to an operator at a monitoring station 30 for use by the operator in determining a sub-region for which to invoke the incident mode. FIG. 9 depicts a grid overlying the portion 902, the grid including numerical indicators 906 corresponding to longitudinal gridlines and alphabetical indicators 904 corresponding to latitudinal gridlines. In an exemplary embodiment, as described herein, computing systems and/or the operator may determine the sub-region from notifications based on the user interface provided to the operator.

Figure 10:
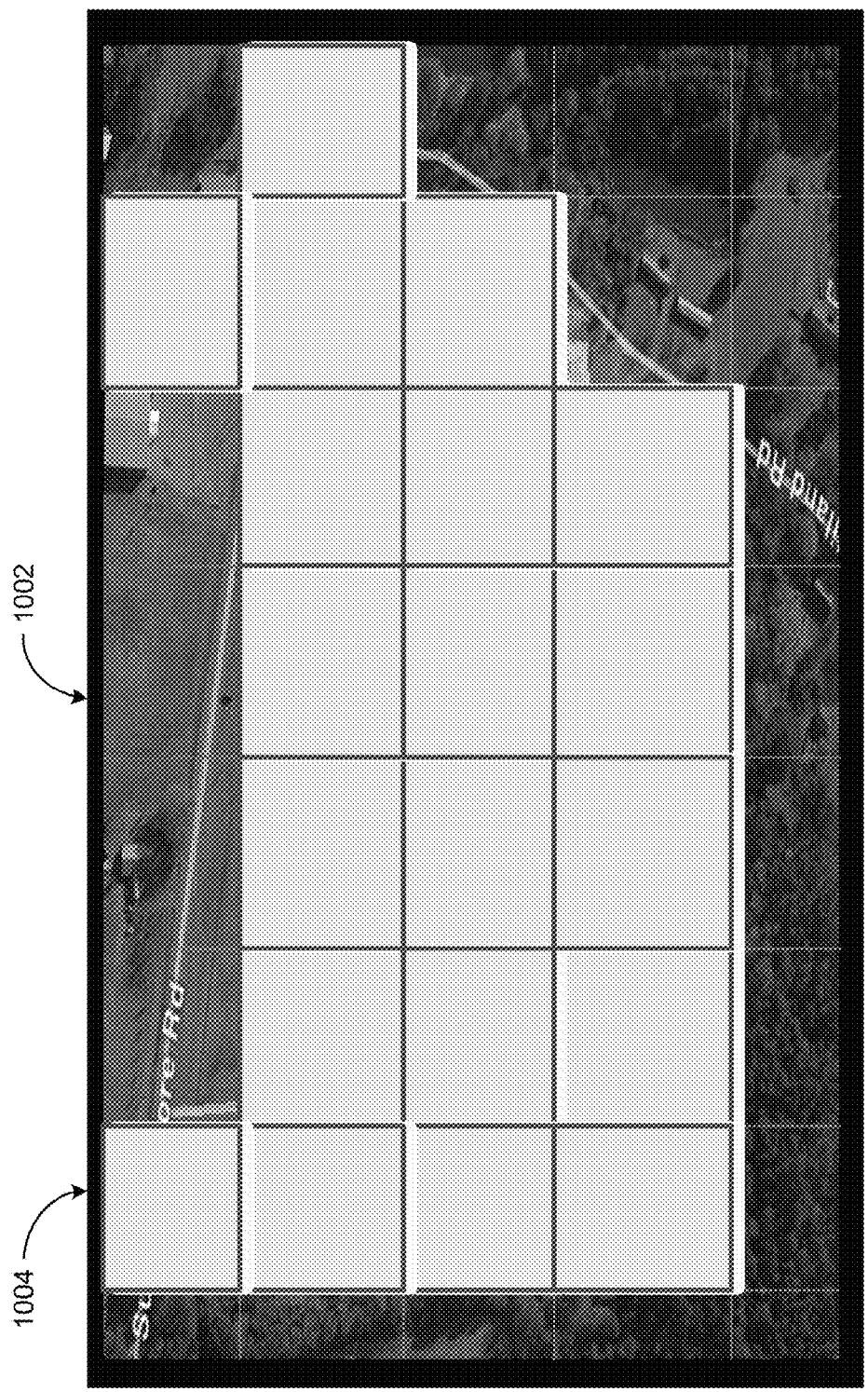
FIG. 10 depicts an exemplary sub-region of a monitored region in accordance with some embodiments of the present disclosure.

FIG. 10 depicts an exemplary sub-region based on the portion 902 depicted in FIG. 9. The portion 902 may have shading 1004 that indicates where the sub-region of the monitored region exists within portion 902. As depicted in FIG. 10, the sub-region of the monitored region may be indicated by shaded blocks 1004.

Figure 11:
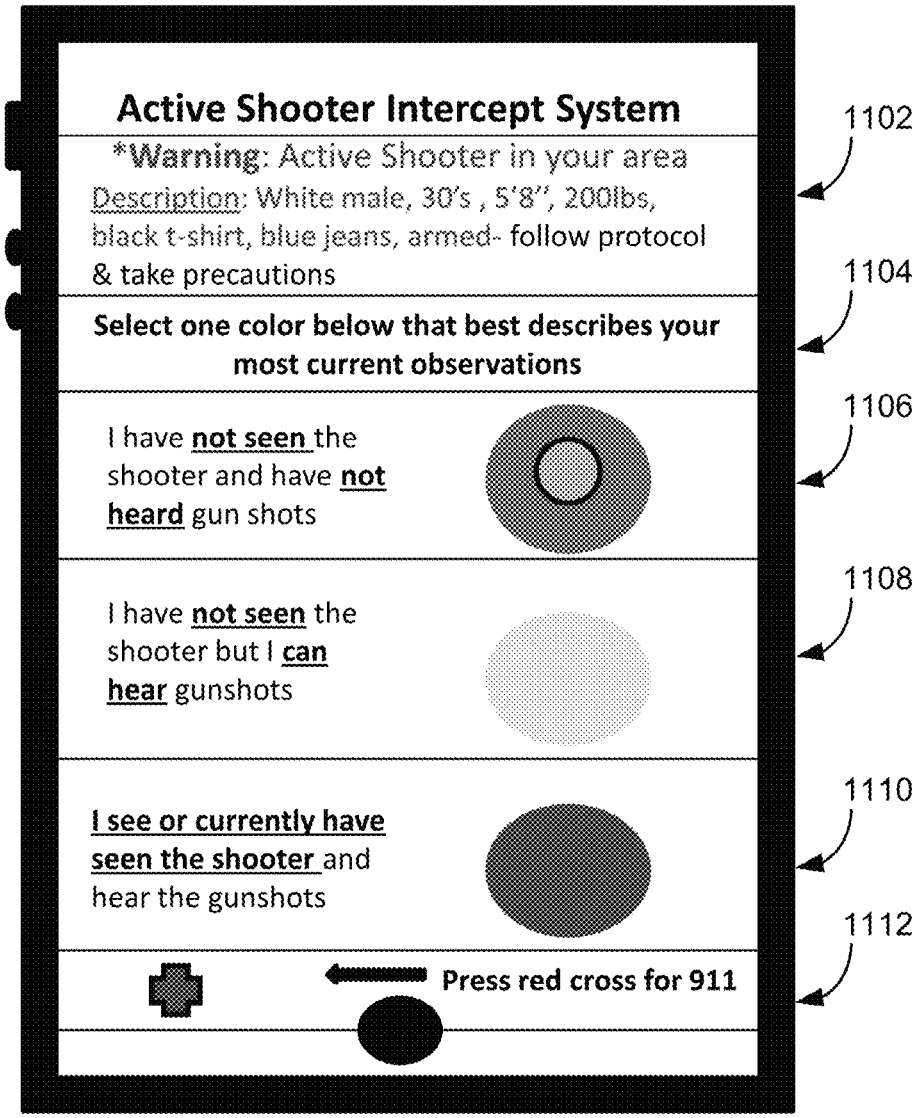
FIG. 11 depicts an exemplary user interface of an observer communication device in accordance with some embodiments of the present disclosure.

FIG. 11 depicts an exemplary user interface of an operator communication device in accordance with some embodiments of the present disclosure. In an embodiment, user interface may include a notification portion 1102, an instructions portion 1104, user interface portions 1106, 1108, and 1110, and an emergency notification portion 1112. Although emergency notification portion 1102 may include any suitable information as described herein, in the embodiment of FIG. 11, emergency notification portion 1102 may inform the observer that there is an active shooter in the observer's area and provide the physical description of the active shooter. Although instructions portion 1104 may include any suitable instructions as described herein, in an embodiment, instructions portion 1104 may provide instructions for responding to a request for information about the active shooter. Although user interface portions 1106, 1108, and 1110 may provide any suitable information as provided herein, in an exemplary embodiment, user interface portion 1106 may provide an option that allows the observer to indicate that they have not seen or heard gunshots. In an embodiment, user interface portion 1108 may provide an input for the observer to indicate they have not seen a shooter but can hear gunshots. In an embodiment, user interface portion 1110 may allow an observer to indicate that they see the shooter and hear gunshots. Emergency notification portion 1112 may provide an input that allows the observer to provide information regarding an emergency condition such as an injury. In some embodiments (not depicted in FIG. 11), providing an input to the emergency notification may provide a sub-menu including a set of options regarding the nature and severity of an injury.

Figure 12:
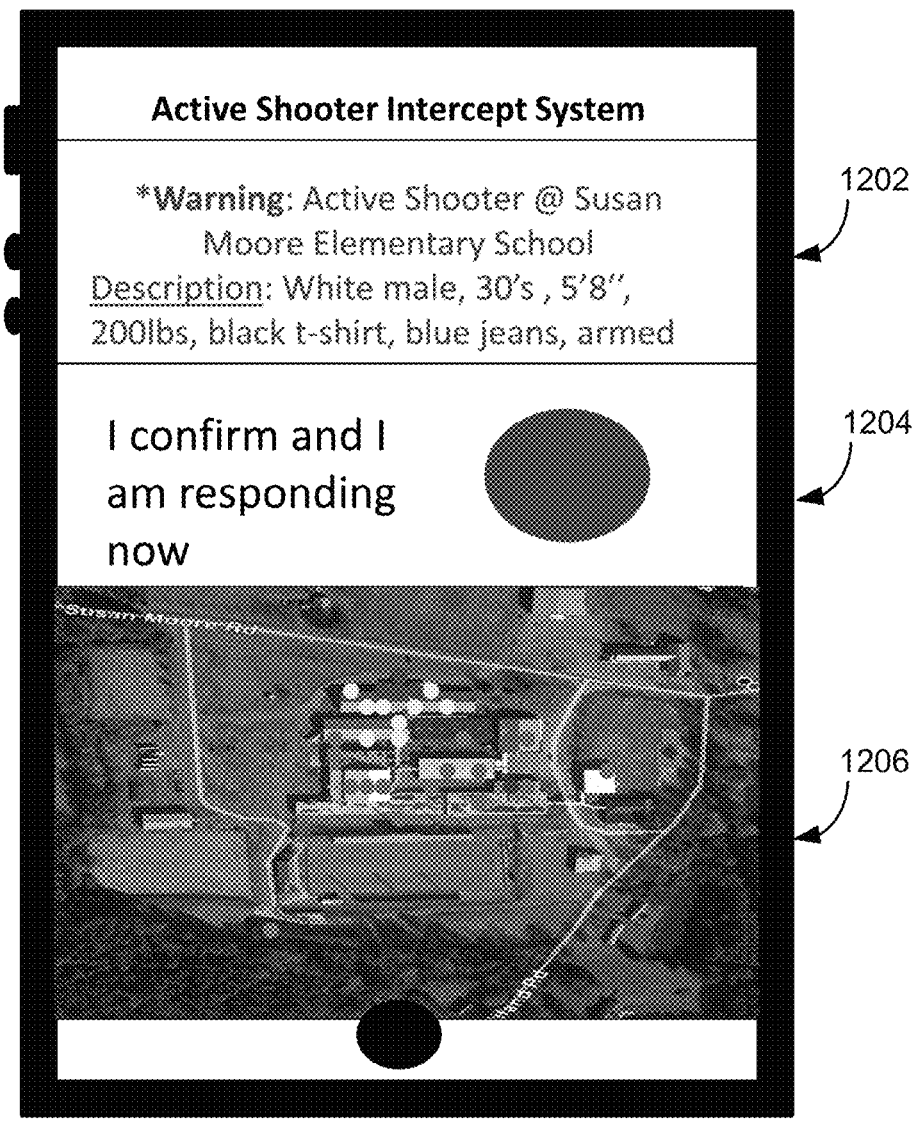
FIG. 12 depicts an exemplary responder user interface in accordance with some embodiments of the present disclosure.

FIG. 12 depicts an exemplary user interface of a responder 40 in accordance with some embodiments of the present disclosure. Although a user interface of a responder 40 may include any suitable user interface elements, in an embodiment in an initial user interface provided to alert a responder to the incident may include a descriptive portion 1202, a user input portion 1204, and a descriptive map portion 1206. In an embodiment, descriptive portion 1202 may provide a description of the incident, the location, and a description of any assailant. In an embodiment, user input portion 1204 may provide an indicator that allows the responder to say that they will respond to the incident. In an embodiment, descriptive map portion 1206 may include a map of the sub-region, as well as indicators relating to the possible location of an assailant (e.g., an active shooter).

Figure 13:
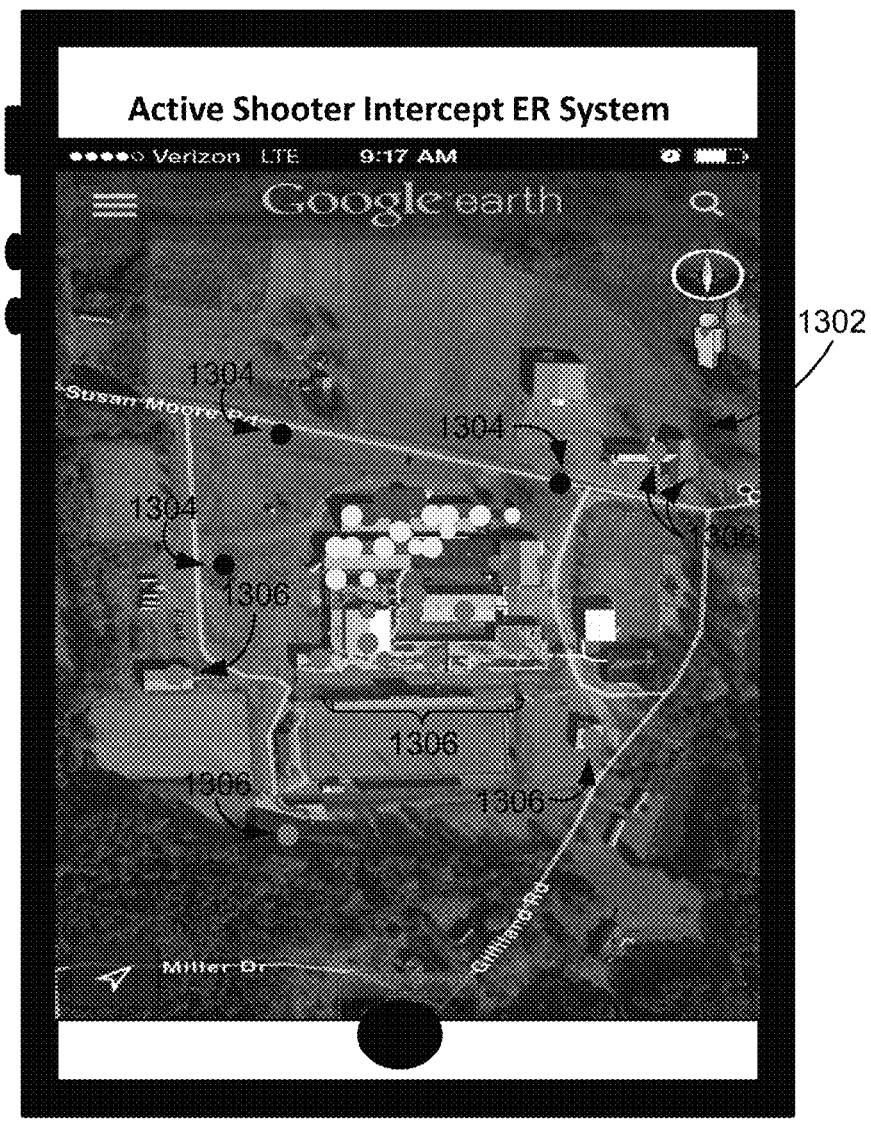
FIG. 13 depicts an exemplary descriptive display of a responder user interface in accordance with some embodiments of the present disclosure.

FIG. 13 depicts an exemplary descriptive map portion 1302 in accordance with some embodiments of the present disclosure. Although a descriptive map portion 1302 may include any suitable information as described herein, in an embodiment, the descriptive map portion 1302 may include information depicting the locations of responders 40 and information relating to observer responses regarding gunshots. In the embodiment of FIG. 13, responders 40 are indicated by dots having a distinctive color, as indicated by 1304. Indicators 1306 may signify observer responses regarding the locations of gunshots. Different colors and/or shadings may convey different information related to the observer's observations. For example, a green color may indicate that a gunshot was neither seen nor heard, a yellow indicator may indicate that a gunshot was heard but the shooter was not seen, and a red indicator may indicate that a shooter was seen and the gunshot was heard. Based on this information, the responders can quickly indicate the likely location of an active shooter. In addition, shading may be used to indicate how recently a particular response was received. For example, any of the green indicator, yellow indicator, or red indicator may reduce in intensity as time elapses since the response was provided. In this manner, responders may be able to identify a movement path of an assailant.

It will be understood that aspects of the systems, apparatuses, structures, and methods describe herein may be modified to be further optimized, and that the foregoing disclosure merely provides an illustration of the principles therein, that that those skilled in the art may make such modifications without departing from the scope of this disclosure. The embodiments described herein are not intended to be limiting, but are provided instead for purposes of illustration. Accordingly, the subject matter described herein should be understood and construed with the full scope and breadth in accordance with the following claims.

What is claimed is:

1. A method for a monitoring station to monitor and respond to an incident, comprising:

receiving, via one or more communication interfaces of the monitoring station, a plurality of monitoring messages from a first plurality of devices, wherein each monitoring message provides monitored data about the incident and location information relating to a location of the incident;

generating, at the monitoring station, an incident message based on the monitored data, wherein the incident message includes incident information;

determining, at the monitoring station, a geographic sub-region associated with the incident based on the location information;

transmitting, from the monitoring station, the incident message to a second plurality of devices located within the geographic sub-region, wherein the incident message requires the second plurality of devices to enter an incident mode, wherein in the incident mode the access of one or more applications of the second plurality of devices to communication interfaces of the second plurality of devices is limited based on the incident mode, wherein the incident message defines an incident mode user interface for display at the second plurality of devices based on the incident information, and wherein the incident message prevents the one or more applications of the plurality of devices from accessing the display;

receiving, via the one or more communication interfaces, a plurality of response messages from one or more of the second plurality of devices, wherein each of the response messages is based on a user input to the incident mode user interface, and wherein each of the response messages provides descriptive information about the incident;

updating the incident information based on the plurality of response messages; and transmitting an updated incident message to the second plurality of devices based on the updated incident information.

2. The method of claim 1, wherein the incident message prevents the one or more applications of the second plurality of devices from accessing a plurality of sensors of the second plurality of devices, wherein the incident message causes the second plurality of devices to collect sensor data from one or more selected sensors of the plurality of sensors, and wherein the response messages include the collected sensor data.

3. The method of claim 2, wherein the one or more selected sensors comprise one or more of a camera or a microphone.

4. The method of claim 3, wherein the one or more selected sensors comprise a microphone, further comprising identifying a gunshot based on the received signal.

5. The method of claim 1, wherein the incident mode user interface comprises a notification portion and a user interface portion.

6. The method of claim 5, wherein the incident mode user interface further comprises an incident mode notification portion.

7. The method of claim 1, wherein the incident message causes the operation of one or more of the plurality of communication interfaces of each of the second plurality of devices to shut down while in the incident mode.

8. The method of claim 1, further comprising:
generating, at the monitoring station, a responder message based on the monitored data, wherein the responder message provides information relating to a location of one or more gunshots within the geographic sub-region;
transmitting, from the monitoring station, the responder message to a plurality of responder communication devices within the geographic sub-region;
generating, at the monitoring station, a second responder message based on the updated incident information, wherein the second responder message provides updated information relating to the location of the one or more gunshots within the sub-region;
transmitting, from the monitoring station, the second responder message to the plurality of responder communication devices within the geographic sub-region.

9. A monitoring station for monitoring and responding to an incident, the monitoring station comprising:
one or more communication interfaces, wherein the monitoring station receives a plurality of monitoring messages from a first plurality of devices, wherein each of the monitoring messages provides monitored data about the incident and location information relating to a location of the incident;
a processing element configured to execute instructions and to control the operation of the one or more plurality of communication interfaces; and
one or memory devices, wherein the one or more memory devices store monitoring instructions, and wherein the monitoring instructions cause the processing element to:
generate an incident message based on the monitored data, wherein the incident message includes incident information;
determine a geographic sub-region associated with the incident based on the location information;
transmit the incident message to a second plurality of devices located within the geographic sub-region, wherein the incident message requires the second plurality of devices to enter an incident mode, wherein in the incident mode the access of one or more applications of the second plurality of devices to communication interfaces of the second plurality of devices is limited based on the incident mode, wherein the incident message defines an incident mode user interface for display at the second plurality of devices based on the incident information, and wherein the incident message prevents the one or more applications of the plurality of devices from accessing the display;
receive, via the one or more communication interfaces, a plurality of response messages from one or more of the second plurality of devices, wherein each of the response messages is based on a user input to the incident mode user interface and wherein each of the response messages provides descriptive information about the incident;
update the incident information based on the plurality of response messages; and
transmit an updated incident message to the second plurality of devices based on the updated incident information.

10. The monitoring station of claim 9, wherein the incident message prevents the one or more applications from accessing a plurality of sensors of the second plurality of devices, wherein the incident message causes the second plurality of devices to receive signals from one or more selected sensors of the plurality of sensors, and wherein the response messages include the received sensor data.

11. The monitoring station of claim 10, wherein the one or more selected sensors comprise one or more of a camera or a microphone.

12. The monitoring station of claim 11, wherein the one or more selected sensors comprise a microphone, further comprising identifying a gunshot based on the received signal.

13. The monitoring station of claim 9, wherein the incident mode user interface comprises a notification portion and a user interface portion.

14. The monitoring station of claim 13, wherein the incident mode user interface further comprises an incident mode notification portion.

15. The monitoring station of claim 9, wherein the incident message causes the operation of one or more of the plurality of communication interfaces of each of the second plurality of devices to shut down while in the incident mode.

16. The monitoring station of claim 9, wherein the monitoring instructions cause the processing element to:
generate a responder message based on the monitored data, wherein the responder message provides information relating to a location of one or more gunshots within the geographic sub-region;
transmit the responder message to a plurality of responder communication devices within the geographic sub-region;
generate a second responder message based on the updated incident information, wherein the second responder message provides updated information relating to the location of the one or more gunshots within the geographic sub-region; and
transmit the second responder message to the plurality of responder communication devices within the geographic sub-region.

17. A non-transitory computer-readable storage medium comprising instructions stored therein, which when executed by one or more processors, cause the one or more processors to perform operations comprising:
receiving a plurality of monitoring messages from a first plurality of devices via one or more communication interfaces of a of a monitoring station, wherein each monitoring message provides monitored data about the incident and location information relating to a location of the incident;

generating an incident message based on the monitored data, wherein the incident message includes incident information;

determining a geographic sub-region associated with the incident based on the location information;

providing the incident message for transmission to a second plurality of devices located within the geographic sub-region, wherein the incident message requires the second plurality of devices to enter an incident mode, wherein in the incident mode the access of one or more applications of the second plurality of devices to communication interfaces of the second plurality of devices is limited based on the incident mode, wherein the incident message defines an incident mode user interface for display at the second plurality of devices based on the incident information, and wherein the incident message prevents the one or more applications of the plurality of devices from accessing the display;

receiving, via the one or more communication interfaces, a plurality of response messages from one or more of the second plurality of devices, wherein each of the response messages is based on a user input to the incident mode user interface, and wherein each of the response messages provides descriptive information about the incident;

updating the incident information based on the plurality of response messages; and transmitting an updated incident message to the second plurality of devices based on the updated incident information.

18. The non-transitory computer-readable storage medium of claim 17, wherein the incident message prevents the one or more applications of the second plurality of devices from accessing a plurality of sensors of the second plurality of devices, wherein the incident message causes the second plurality of devices to collect sensor data from one or more selected sensors of the plurality of sensors, and wherein the response messages include the collected sensor data.

19. The non-transitory computer-readable storage medium of claim 18, wherein the one or more selected sensors comprise one or more of a camera or a microphone.

20. The non-transitory computer-readable storage medium of claim 19, wherein the one or more selected sensors comprise a microphone, further comprising identifying a gunshot based on the received signal.

21. The non-transitory computer-readable storage medium of claim 17, wherein the incident mode user interface comprises a notification portion and a user interface portion.

22. The non-transitory computer-readable storage medium of claim 17, wherein the incident mode user interface further comprises an incident mode notification portion.

23. The non-transitory computer-readable storage medium of claim 17, wherein the incident message causes the operation of one or more of the plurality of communication interfaces of each of the second plurality of devices to shut down while in the incident mode.

24. The non-transitory computer-readable storage medium of claim 17, wherein the instructions further comprise instructions that cause the one or more processors to perform operations comprising:

generating a responder message based on the monitored data, wherein the responder message provides information relating to a location of one or more gunshots within the geographic sub-region;

providing the responder message for transmission to a plurality of responder communication devices within the geographic sub-region;

generating a second responder message based on the updated incident information, wherein the second responder message provides updated information relating to the location of the one or more gunshots within the geographic sub-region;

providing the second responder for transmission to the plurality of responder communication devices within the geographic sub-region.

* * * * *